United States Patent [19]

Nohr et al.

[11] Patent Number: 5,413,655
[45] Date of Patent: May 9, 1995

[54] THERMOPLASTIC COMPOSITIONS AND NONWOVEN WEBS PREPARED THEREFROM

[75] Inventors: Ronald S. Nohr, Roswell; John G. MacDonald, Decatur, both of Ga.

[73] Assignee: Kimberly-Clark Corporation, Neenan, Wis.

[21] Appl. No.: 223,800

[22] Filed: Apr. 6, 1994

Related U.S. Application Data

[62] Division of Ser. No. 783,438, Oct. 25, 1991, Pat. No. 5,344,862.

[51] Int. Cl.$^6$ .................. D04H 3/16; D01D 5/12; C08K 5/54
[52] U.S. Cl. .................. 156/167; 156/296; 156/244.24; 156/209; 156/308.4; 264/210.8; 524/265; 524/269; 524/506; 525/100; 525/106
[58] Field of Search .................. 264/210.8; 523/212, 523/213; 524/265, 269, 506; 525/100, 106; 156/167, 296, 244.24, 209, 308.4

[56] References Cited

U.S. PATENT DOCUMENTS

| | | | |
|---|---|---|---|
| Re. 32,514 | 10/1987 | Steklenski | 524/32 |
| D. 239,566 | 4/1376 | Vogt | D59/2 R |
| D. 264,512 | 5/1982 | Rogers | D59/2 B |
| 2,863,738 | 12/1958 | Antwerp | 23/277 |
| 3,016,599 | 1/1962 | Perry, Jr. | 28/78 |
| 3,207,735 | 9/1965 | Wijga | 260/93.7 |
| 3,207,737 | 9/1965 | Wales | 260/93.7 |
| 3,207,739 | 9/1965 | Wales | 260/93.7 |
| 3,299,029 | 1/1967 | Binsbergen et al. | 260/93.7 |
| 3,341,394 | 9/1967 | Kinney | 161/72 |
| 3,360,421 | 12/1967 | Sands | 161/63 |
| 3,423,184 | 1/1969 | Biegler et al. | 23/277 |
| 3,620,821 | 11/1971 | Jones | 117/126 |
| 3,629,308 | 12/1971 | Bailey et al. | 260/448.2 |
| 3,642,453 | 2/1972 | Chilton et al. | 23/294 |
| 3,692,618 | 9/1972 | Dorschner et al. | 161/72 |
| 3,692,862 | 4/1972 | Dorschner et al. | 264/290 |
| 3,704,198 | 11/1972 | Prentice | 161/148 |
| 3,705,068 | 11/1972 | Dobo et al. | 156/441 |
| 3,755,527 | 8/1973 | Keller et al. | 264/210 |

(List continued on next page.)

FOREIGN PATENT DOCUMENTS

| | | |
|---|---|---|
| 0655055 | 1/1963 | Canada . |
| 1049682 | 2/1979 | Canada . |
| 82303495.4 | 1/1983 | European Pat. Off. . |
| 82303495.4 | 2/1983 | European Pat. Off. . |
| 88311999.8 | 6/1989 | European Pat. Off. . |

(List continued on next page.)

OTHER PUBLICATIONS

"Surfactants at Th. Goldschmidt AG", Th. Goldschmidt AG, D-4300 Essen 1, West Germany.
"Goldschmidt informiert . . . ", 1/82, Nr. 56, Mar. 1982, English Edition, Th. Goldschmidt AG, D-4300 Essen 1, West Germany.
"Goldschmidt informiert . . . ", 4/84, No. 63, Dec. 1984, Functional Oligomers, Th. Goldschmidt AG, D-4300 Essen 1 West Germany.
"SILWET® Surfactants", B. SC-877, P8-2538, 2/88-10M, Union Carbide Corp., Specialty Chemicals Div., Danbury, Conn. 06817-0001.
"SILWET® Surface Active Copolymers", Bulletin (List continued on next page.)

*Primary Examiner*—Peter D. Mulcahy
*Attorney, Agent, or Firm*—William E. Maycock

[57] ABSTRACT

A melt-extrudable thermoplastic composition is provided which includes a thermoplastic polyolefin and an additive system made up of a first component and a second component, in which (A) the first component is a defined polysiloxane polyether having a molecular weight of from about 350 to about 18,000 and which is present in an amount of from about 0.1 to about 3 percent by weight, based on the amount of thermoplastic polyolefin; and (B) the second component is a hydrophobic fumed silica, in which the weight ratio of the first component to the second component is in the range of from about 20 to about 300. Such composition yields, upon melt-extrusion, either nonwoven webs having significantly increased tensile strengths when compared to nonwoven webs prepared from the thermoplastic polyolefin alone, or wettable webs requiring an amount of first component which is significantly less than that required in the absence of the second component.

12 Claims, 6 Drawing Sheets

U.S. PATENT DOCUMENTS

| | | | |
|---|---|---|---|
| 3,766,115 | 10/1973 | Sands | 161/63 |
| 3,802,817 | 4/1974 | Matsuki et al. | 425/66 |
| 3,849,241 | 11/1974 | Buntin et al. | 161/169 |
| 3,853,651 | 12/1974 | Porte | 156/73.6 |
| 3,855,046 | 12/1974 | Hansen et al. | 161/150 |
| 3,867,188 | 2/1975 | Campbell et al. | 117/138.8 |
| 3,929,509 | 12/1975 | Taskier | 136/146 |
| 3,973,068 | 8/1976 | Weber | 428/198 |
| 3,978,185 | 8/1976 | Buntin et al. | 264/93 |
| 4,048,290 | 9/1977 | Lee | 423/336 |
| 4,064,605 | 12/1977 | Akiyama et al. | 28/103 |
| 4,070,218 | 1/1978 | Weber | 156/167 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,105,569 | 8/1978 | Crossfield | 252/8.6 |
| 4,118,531 | 10/1978 | Hauser | 428/224 |
| 4,150,013 | 4/1979 | Punderson | 260/42.26 |
| 4,169,816 | 10/1979 | Tsien | 252/511 |
| 4,292,290 | 9/1981 | Tunison, III | 423/336 |
| 4,340,563 | 7/1982 | Appel et al. | 264/518 |
| 4,405,297 | 9/1983 | Appel et al. | 425/72 |
| 4,426,203 | 1/1984 | Abel et al. | 8/138 |
| 4,434,204 | 2/1984 | Hartman et al. | 428/199 |
| 4,444,563 | 4/1984 | Abel | 8/588 |
| 4,446,090 | 5/1984 | Lovgren et al. | 264/211 |
| 4,480,009 | 10/1984 | Berger | 428/447 |
| 4,493,868 | 1/1985 | Meitner | 428/171 |
| 4,499,149 | 2/1985 | Berger | 428/447 |
| 4,500,659 | 2/1985 | Kroupa et al. | 523/213 |
| 4,535,113 | 8/1985 | Foster | 524/262 |
| 4,563,190 | 1/1986 | Topfl | 8/524 |
| 4,578,414 | 3/1986 | Sawyer et al. | 524/310 |
| 4,585,830 | 4/1986 | Sweet | 524/862 |
| 4,611,024 | 9/1986 | Wolfe | 524/366 |
| 4,627,811 | 12/1986 | Greiser et al. | 425/72 |
| 4,644,045 | 2/1987 | Fowells | 526/348 |
| 4,645,691 | 2/1987 | Ona et al. | 427/180 |
| 4,652,489 | 3/1987 | Crass et al. | 428/337 |
| 4,659,777 | 4/1987 | Riffle et al. | 525/100 |
| 4,663,220 | 5/1987 | Wisneski et al. | 428/221 |
| 4,672,005 | 6/1987 | Dyer | 428/474 |
| 4,689,362 | 8/1987 | Dexter | 524/266 |
| 4,698,388 | 10/1987 | Ohmura et al. | 525/88 |
| 4,745,142 | 5/1988 | Ohwaki et al. | 524/87 |
| 4,808,650 | 2/1989 | Titus et al. | 524/108 |
| 4,849,022 | 7/1989 | Kobayashi et al. | 206/490 |
| 4,857,251 | 8/1989 | Nohr et al. | 264/103 |
| 4,877,679 | 10/1989 | Leatherman et al. | 428/224 |
| 4,920,168 | 4/1990 | Norh et al. | 524/188 |
| 4,923,914 | 5/1990 | Nohr et al. | 524/99 |
| 4,981,899 | 5/1991 | Nakamura et al. | 524/493 |
| 5,137,973 | 8/1992 | Khanna et al. | 525/177 |

FOREIGN PATENT DOCUMENTS

| | | |
|---|---|---|
| 91107040.7 | 11/1991 | European Pat. Off. |
| 2506667 | 12/1976 | Germany |
| 51-22740 | 2/1976 | Japan |
| 60-217207 | 10/1985 | Japan |
| 1273445 | 6/1972 | United Kingdom |

OTHER PUBLICATIONS

SUI–394A, 7/85–5M, Union Carbide Corporation, Silicones and Urethane Intermediates, Danbury, Conn. 06817–0001.

"Silicon Compounds Register and Review", Petrarch Systems Silanes and Silicones, pp. 253–300 ("Silicones & Silicon–Containing Polymers"), Petrarch Systems, Bristol, Pa. 19007

R. R. Butin, et al. "Melt Blowing–A One–Step Web Process for New Nonwoven Products", Journal of the Technical Association of the Pulp and Paper Ind., vol. 56, No. 4, pp. 74–77 (1973).

R. H. Somani, et al., Macromolecules, 14, 886 (1981).

S. N. Pandit, et al., Polym. Compos., 2, 68 (1981).

"CAB–O–SIL® TS–720 Hydrophobic Fumed Silica," Apr. 1, 1988, Cabot Corp. Cab-O-Sil Division, Tuscola, Ill. 61953.

V. A. Wente, "Superfine Thermoplastic Fibers", Industrial and Engineering Chemistry, vol. 48, No. 8, pp. 1342–1346 (1956).

V. A. Wente, et al., "Manufacture of Superfine Organic Fibers" Navy Research Laboratory, Washington, D.C., NRL Report 4366 (111437), dated May 25, 1954, U.S. Dept of Commerce, Office of Technical Services.

"CAB–O–SIL® Fumed Silica Properties and Functions," CGEN–8, Jun. 1987 Cabot Corp., Cab-O-Sil Division, Tuscola, Ill. 61953.

"CAB–O–SIL® TS–530 Treated Fumed Silica," Jul. 1989, Cabot Corp., Cab-O-Sil Division, Tuscola, Ill. 61953.

"CAB–O–SIL® TS–610 Treated Fumed Silica," Oct. 1989, Cabot Corp. Cab-O-Sil Division, Tuscola, Ill. 61953.

Chatterjee & Price, "Hetergeneous Nucleation of Crystallization of High Polymers from the Melt. I. Substrate–Induced Morphologies", J. Polymer Science, 13, 2369 (1975).

Collington, "The Nucleation of Crystalline Olefins", Polypropylene: The Way Ahead, a conference of the Plastics and Rubber Institute, Madrid, Spain, Nov. 1989.

Garg and Stein, "Crystallization and Morphology of Nucleated Polymers", Antec '88, 1021.

THERMOPLASTIC COMPOSITIONS AND NONWOVEN WEBS PREPARED THEREFROM

This is a divisional application of Ser. No. 07/783,438, filed on Oct. 25, 1991, now U.S. Pat. No. 5,344,862.

BACKGROUND OF THE INVENTION

The present invention relates to a melt-extrudable thermoplastic composition which contains an additive system. The composition, when melt-extruded to form a nonwoven web, results in a web having improved tensile strength characteristics or in a wettable web which does not become significantly less wettable over time.

Thermoplastic compositions are described in U.S. Pat. No. 4,923,914 to Ronald S. Nohr and J. Gavin MacDonald, which patent is incorporated herein by reference. The patent describes a surface-segregatable, melt-extrudable thermoplastic composition which comprises at least one thermoplastic polymer and at least one additive having at least two moieties, A and B, in which:

(A) the additive is compatible with the polymer at melt extrusion temperatures but is incompatible at temperatures below melt extrusion temperatures, but each of moiety A and moiety B, if present as separate compounds, would be incompatible with the polymer at melt extrusion temperatures and at temperatures below melt extrusion temperatures;

(B) moiety B has at least one functional group which imparts to the additive at least one desired characteristic;

(C) the molecular weight of the additive is in the range of from about 400 to about 15,000; and (D) the weight ratio of the polymer to the additive is in the range of from about 1 to about 1,000;

with the proviso that the additive cannot be a compound having the general formula,

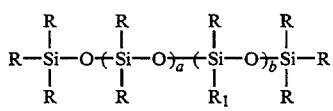

in which each R independently is a monovalent organic group selected from the group consisting of alkyl groups; $R_1$ is a monovalent organic group containing at least one ethyleneoxy group, vicinal epoxy group, or amino group; and a and b, which can be the same or different, each have a value of at least 1. In preferred embodiments, the additive is a siloxane-containing compound, and one of the desired characteristics is wettability by water when the polymer is inherently hydrophobic.

The compositions described in that patent are particularly useful for the formation of nonwoven webs by such melt-extrusion processes as meltblowing, coforming, and spunbonding. Upon being melt-extruded, such compositions result in a fiber having a differential, increasing concentration of the additive from the center to the surface thereof, such that the concentration of additive toward the surface of the fiber is greater than the average concentration of additive in the more central region of the fiber and imparts to the surface of the fiber at least one desired characteristic which otherwise would not be present. The additive is miscible with the polymer at melt extrusion temperatures, under which conditions the additive and the polymer form a metastable solution. As the temperature of the newly formed fiber drops below melt extrusion temperatures, the additive becomes significantly less compatible with the polymer. Concurrent with this marked change in compatibility, the polymer begins to solidify. Both factors contribute to the rapid migration or segregation of the additive toward the surface which takes place in a controllable manner.

When the additive was a siloxane-containing compound and the desired characteristic was water-wettability, the resulting nonwoven webs, depending upon the additive and/or additive level, could become less wettable over time. This loss of wettability, or aging, was accelerated when the polymer composition contained titanium dioxide. Although the teaching of U.S. Pat. No. 4,923,914 represents a significant improvement over prior methods of imparting water-wettability to shaped articles, e.g., nonwoven webs, made from inherently hydrophobic polymers, the aging problem was a limitation on the usefulness of surface-segregatable compositions, particularly for disposable absorbent products. A subclass of the additives encompassed by U.S. Pat. No. 4,923,914 subsequently was discovered which permitted the preparation of wettable nonwoven webs which remained wettable for at least about two years at ambient temperature. Such subclass is described and claimed in application Ser. No. 07/566,589, entitled SURFACE-SEGREGATABLE COMPOSITIONS AND NONWOVEN WEBS PREPARED THEREFROM and filed Aug. 13, 1990 in the names of Ronald S. Nohr and J. Gavin MacDonald.

Application Ser. No. 07/566,589 provides a surface-segregatable, melt-extrudable thermoplastic composition which comprises at least one thermoplastic polyolefin and at least one additive having the general formula,

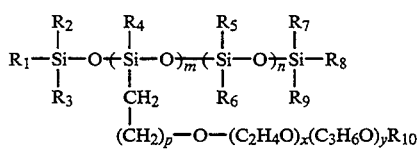

in which:

(a) $R_1$–$R_9$ are independently selected monovalent $C_1$–$C_3$ alkyl groups;

(b) $R_{10}$ is hydrogen or a monovalent $C_1$–$C_3$ alkyl group;

(c) m represents an integer of from 1 to about 4;

(d) n represents an integer of from 0 to about 3;

(e) the sum of m and n is in the range of from 1 to about 4;

(f) p represents an integer of from 0 to about 5;

(g) x represents an integer of from 1 to about 10;

(h) y represents an integer of from 0 to about 5;

(i) the ratio of x to y is equal to or greater than 2;

(j) said additive has a molecular weight of from about 350 to about 1,400; and (k) said additive is present in an amount of from about 0.5 to about 5 percent by weight, based on the amount of thermoplastic polyolefin.

Such application also provides a method for preparing a wettable nonwoven web which remains wettable after its formation for at least two years at ambient temperature, which method comprises:

(A) melting a mixture which comprises a thermoplastic polyolefin and an additive;
(B) forming fibers by extruding the resulting melt through a die at a shear rate of from about 50 to about 30,000 sec$^{-1}$ and a throughput of no more than about 5.4 kg/cm/hour;
(C) drawing said fibers; and
(D) collecting said fibers on a moving foraminous surface as a web of entangled fibers;

in which the additive meets all of the requirements just described relative to the composition.

It subsequently was discovered that the use of an additive system comprising certain of the additives of U.S. Pat. No. 4,923,914, including some of the additives of application Ser. No. 07/566,589, and a modified fumed silica having a hydrophobic surface unexpectedly gave either of two results: (1) the amount of additive required in application Ser. No. 07/566,589 can be reduced by up to roughly 50 percent without adversely affecting the wettability of the resulting nonwoven web, or (2) when the additive is a polysiloxane polyether having a molecular weight of at least about 3,000, the resulting nonwoven web is not wettable, i.e., it remains hydrophobic, but exhibits improved tensile strength characteristics as compared with a nonwoven web prepared from a thermoplastic composition lacking the hydrophobic fumed silica.

Silica and other materials have been incorporated into thermoplastic polymers, including polypropylene. For example, the inclusion of an organic peroxide and a nucleating agent in polypropylene is described in Japanese Patent Publication No. 60-217207. The nucleating agent can be an organic salt, an organic compound, or an inorganic material such as silica, alum, titanium dioxide, carbon black, and various clay minerals.

References which describe the inclusion in polypropylene or other thermoplastic polymer of an organic material include U.S. Pat. No. 3,207,735 to Wijga (benzoic acid, substituted benzoic acids, hexahydro analogs thereof, and related compounds), U.S. Pat. No. 3,207,737 to Wales (aluminum salts of benzoic acid and related compounds), U.S. Pat. No. 3,207,739 to Wales (Group I and II metal salts of certain mono- and polycarboxylic acids), U.S. Pat. No. 3,299,029 to Binsbergen et al. (aluminum salts of benzoic acid and related compounds), U.S. Pat. No. 4,611,024 to Wolfe (an acetal of an alditol and a hydrotalcite), and U.S. Pat. No. 4,808,650 to Titus et al. (fluorinated dibenzylidene sorbitol additives); and Japanese Patent Publication No. 51-22740 (benzylidene sorbitol).

Finally, studies relating to the heterogeneous nucleation of polymers have been reported. Examples of such studies include Chatterjee and Price, "Heterogeneous Nucleation of Crystallization of High Polymers from the Melt. I. Substrate-Induced Morphologies", *J. Polym. Sci.*, 13, 2369 (1975); Collington, "The Nucleation of Crystalline Olefins", *Polypropylene: The Way Ahead*, a conference of the Plastics and Rubber Institute, Madrid, Spain, November 1989; and Garg and Stein, "Crystallization and Morphology of Nucleated Polymers", Antec '88, 1021.

SUMMARY OF THE INVENTION

It therefore is an object of the present invention to provide a melt-extrudable thermoplastic composition which comprises a thermoplastic polyolefin and an additive system comprising a first component and a second component.

Another object of the present invention is to provide a method for preparing a nonwoven web having improved tensile strength characteristics as compared to nonwoven webs prepared from the thermoplastic polyolefin alone.

A further object of the present invention is to provide a method for preparing a wettable nonwoven web which (i) is wettable immediately after its formation without any post-formation treatment, (ii) remains wettable after its formation for at least two years at ambient temperature, and (iii) employs a reduced amount of a surface-segregatable first component compared with the amount of such surface-segregatable first component required in the absence of a second component.

Yet another object of the present invention is to provide a melt-extruded fiber, a nonwoven web, an article of manufacture, and a disposable absorbent product.

These and other objects will be apparent to one having ordinary skill in the art from a consideration of the specification and claims which follow.

Accordingly, the present invention provides a melt-extrudable thermoplastic composition which comprises a thermoplastic polyolefin and an additive system comprising a first component and a second component, in which:

(A) said first component is a polysiloxane polyether having the general formula,

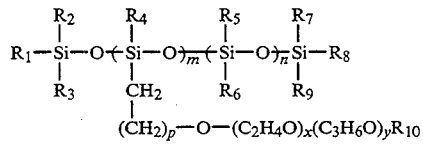

in which:
(1) $R_1-R_9$ are independently selected monovalent $C_1-C_3$ alkyl groups;
(2) $R_{10}$ is hydrogen or a monovalent $C_1-C_3$ alkyl group;
(3) m represents an integer of from 1 to about 100;
(4) n represents an integer of from 0 to about 100;
(5) the sum of m and n is in the range of from 1 to about 100;
(6) p represents an integer of from 0 to about 5;
(7) x represents an integer of from 1 to about 25;
(8) y represents an integer of from 0 to about 25;
(9) the ratio of x to y is equal to or greater than 2;
(10) said first component has a molecular weight of from about 350 to about 18,000; and
(11) said first component is present in an amount of from about 0.1 to about 3 percent by weight, based on the amount of thermoplastic polyolefin; and (B) said second component is a hydrophobic fumed silica, in which the weight ratio of said first component to said second component is in the range of from about 20 to about 300.

When the composition is to be used to prepare a nonwoven web having improved tensile strength characteristics, the sum of m and n is in the range of from about 4 to about 100; x represents an integer of from about 4 to about 25; said first component has a molecular weight of from about 3,000 to about 18,000; and the weight ratio of said first component to said second component is in the range of from about 20 to about 70.

When the composition needs to be surface-segregatable in order to prepare a wettable nonwoven web having reduced amounts of first component, m represents an integer of from to about 4; n represents an integer of from 0 to about 3; the sum of m and n is in the range of from 1 to about 4; x represents an integer of from 1 to about 10; y represents an integer of from 0 to about 5; said first component has a molecular weight of from about 350 to about 1,200; and said first component is present in an amount of from about 0.35 to about 3 percent by weight, based on the amount of thermoplastic polyolefin.

The present invention also provides methods for preparing (a) a nonwoven web having improved tensile strength characteristics and (b) a wettable nonwoven web which (i) is wettable immediately after its formation without any post-formation treatment, (ii) remains wettable after its formation for at least two years at ambient temperature, and (iii) employs a reduced amount of a surface-segregatable first component compared with the amount of such surface-segregatable first component required in the absence of a second component.

In certain preferred embodiments, the polyolefin is polypropylene. In other preferred embodiments, the nonwoven web produced in accordance with a method of the present invention is pattern bonded by the application of heat and pressure.

DETAILED DESCRIPTION OF THE INVENTION

Figure 1:
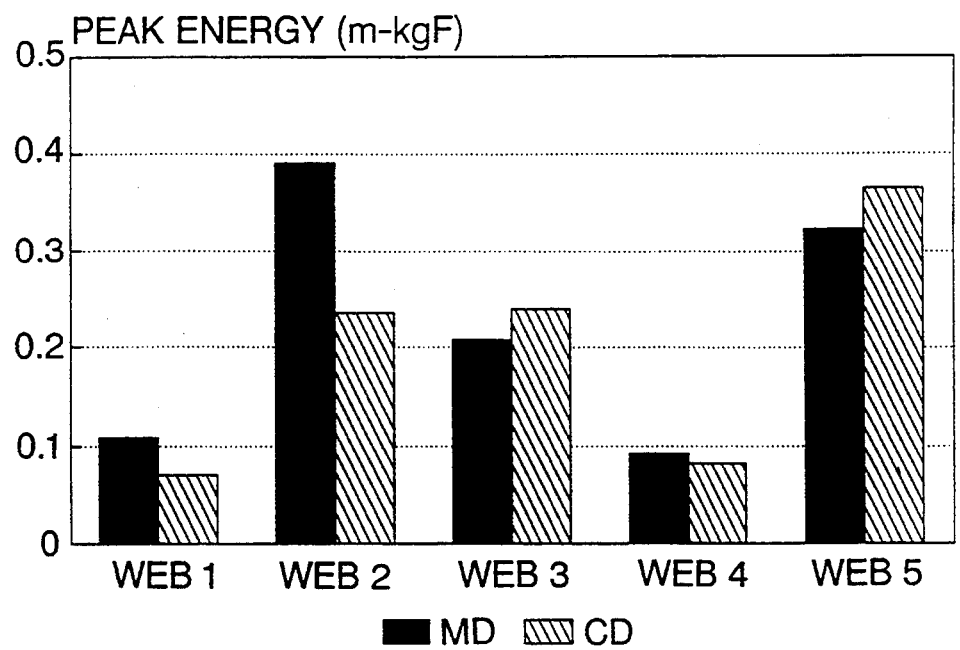
FIGS. 1-9, inclusive, are bar graphs comparing the tensile strength characteristics of nonwoven webs prepared in accordance with the present invention with such characteristics of control webs.

As already stated, the compositions of the present invention can be used to prepare nonwoven webs having either improved tensile strength characteristics or long-term hydrophilicity or wettability. A number of variables or conditions are generally applicable, regardless of the characteristics of the nonwoven web produced. Such variables or conditions are discussed first under the heading, "Common Variables or Conditions;" definitions are included under this first heading. For convenience and clarity of presentation, however, the remainder of the discussion has been separated into two parts, one which deals with tensile-strength-improving aspects and the other which deals with hydrophilicity. These two parts have been given the headings, "Nonwoven Webs Having Improved Tensile Strength Characteristics" and "Hydrophilic or Wettable Nonwoven Webs," respectively. The use of such headings, however, should not be construed as in any way limiting either the spirit or scope of the present invention.

Common Variables or Conditions

As used herein, the term "fibers" includes substantially continuous fibers which are of a length such that they can be regarded as continuous in comparison with their diameters, such as may be produced by a meltblowing process. The term also includes continuous fibers, such as those produced by a spunbonding process or by a typical melt-spinning process. Thus, the term "continuous fibers" is intended to exclude substantially continuous fibers.

The term "tensile strength characteristics", as used herein, has reference primarily to peak energy and peak load values as determined by Federal Test Method 5100 (Standard No. 191A). Other procedures, such as the trap tear test, can be used, however.

Such terms as "melt-extrudable", "melt-extruded", and the like are meant to refer or relate to any melt-extrusion process for forming a nonwoven web in which melt-extrusion to form fibers is followed by web formation, typically concurrently, on a foraminous support. The terms include, among others, such well-known processes as meltblowing, coforming, spunbonding, and the like. The terms also refer or relate to processes in which web formation is a separate, independent step after fiber formation; nonwoven webs prepared by such processes include bonded carded webs and the like.

As used herein, the term "weight ratio" means the approximate relationship by weight of the amount of first component in the additive system to the amount of second component. More specifically, the weight ratio is the quotient of the amount of first component divided by the amount of second component. Thus, the weight ratio is expressed as a whole number which represents the approximate weight of first component per unit weight of second component. Consequently, the weight ratio has no units.

In general, the term "thermoplastic polyolefin" is used herein to mean any thermoplastic polyolefin which can be used for the preparation of nonwoven webs. Examples of thermoplastic polyolefins include polyethylene, polypropylene, poly(1-butene), poly(2-butene), poly(1-pentene), poly(2-pentene), Poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like.

The preferred polyolefins are those which contain only hydrogen and carbon atoms and which are prepared by the addition polymerization of one or more unsaturated monomers. Examples of such polyolefins include, among others, polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like. In addition, such term is meant to include blends of two or more polyolefins and random and block copolymers prepared from two or more different unsaturated monomers. Because of their commercial importance, the most preferred polyolefins are polyethylene and polypropylene.

The composition of the present invention must contain a first component which is a polysiloxane polyether having the general formula,

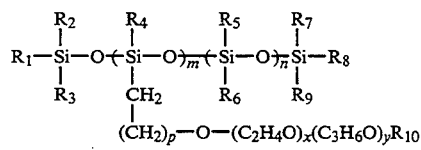

in which:
(1) $R_1$–$R_9$ are independently selected monovalent $C_1$–$C_3$ alkyl groups;

(2) $R_{10}$ is hydrogen or a monovalent $C_1$-$C_3$ alkyl group;
(3) m represents an integer of from 1 to about 100;
(4) n represents an integer of from 0 to about 100;
(5) the sum of m and n is in the range of from 1 to about 100;
(6) p represents an integer of from 0 to about 5;
(7) x represents an integer of from 1 to about 25;
(8) y represents an integer of from 0 to about 25;
(9) the ratio of x to y is equal to or greater than 2;
(10) said first component has a molecular weight of from about 350 to about 18,000; and
(11) said first component is present in an amount of from about 0.1 to about 3 percent by weight, based on the amount of thermoplastic polyolefin.

In preferred embodiments, each of $R_1$-$R_9$ is a methyl group. In other preferred embodiments, R10 is either hydrogen or a methyl group.

The term "first component" generally is used throughout this specification and in the claims to refer to any polysiloxane polyether as defined herein, regardless of the properties desired in the nonwoven web prepared from a composition containing the additive system. On the other hand, the term may be used in a specific context to refer to a particular type of first component, i.e., a first component selected to provide either a nonwoven web having improved tensile strength characteristics or a hydrophilic nonwoven web. For convenience, a first component or polysiloxane polyether employed in a composition to be used for the preparation of hydrophilic webs often is referred to throughout this specification as a "surface-segregatable" first component or polysiloxane polyether. A first component or polysiloxane polyether employed for the purpose of providing nonwoven webs having improved tensile strength characteristics often is referred to herein as a "tensile strength-improving" first component or polysiloxane polyether, or "TSI" first component or polysiloxane polyether.

There is, however, an important distinction between the two types of additive systems which needs to be understood. In an additive system designed to provide a hydrophilic nonwoven web, the first component does, in fact, migrate or segregate to the surfaces of the fibers. In so doing, the first additive apparently becomes disassociated from the second component. Nevertheless, for reasons not fully understood, the presence of the second component permits the use of lower levels of first component in order to impart hydrophilicity to the fibers. Consequently, it is technically correct in this instance to refer to the first component as a surface-segregatable first component.

When the additive system is designed to provide a nonwoven web having improved tensile strength characteristics, however, the first component does not migrate or segregate to the surfaces of the fibers. Moreover, the first component is not known to become disassociated from the second component. In other words, the tensile strength improvement results from the combination of the two components. In the case of an additive system intended to provide a hydrophilic nonwoven web, the required alteration of the surface characteristics of the fibers results solely from the first component. It is important to understand, therefore, that the term "TSI first component" neither means nor implies that the first component alone causes the improvements in nonwoven web tensile strength characteristics. The term is used for convenience and simply is a shorter way of designating a first component used in a tensile-strength-improving additive system.

Turning again to the general formula for the first component as set forth above, the preferred values of such other variables as m, n, p, x, y, first component molecular weight, and amount of first component depend primarily on whether the first component is a TSI polysiloxane polyether or a surface-segregatable polysiloxane polyether, as described later. In general, however, the amount of first component will be in the range of from about 0.1 to about 3 percent by weight, based on the amount of thermoplastic polyolefin.

From the discussion thus far, it should be evident to those having ordinary skill in the art that the terms "first component" and "polysiloxane polyether" are synonymous or interchangeable. In other words, the first component always will be a polysiloxane polyether. An effort has been made throughout this specification to use the term "first component" whenever possible. There are a few occasions, however, when readability seemed to be improved by using the term "polysiloxane polyether" instead of "first component." Nevertheless, the interchangeability of the two terms should be kept in mind.

The first component in general can be either a liquid or a solid. Regardless of its type, a liquid first component is preferred. The use of a liquid first component simplifies the preparation of the claimed additive system and composition, as will be described later.

The term "first component" is used broadly herein to encompass the use of more than one first component in a given additive system, i.e., a mixture of two or more first components or polysiloxane polyethers. Moreover, it should be appreciated by those having ordinary skill in the art that the first component as defined herein typically is not available as a pure compound. Thus, the presence of impurities or related materials which may not come within the general formulas given above for the first component does not remove any given material from the spirit and scope of the present invention. For example, the preparation of a first component useful in the present invention typically results in the presence of free polyether. The presence of such free polyether is not known to have deleterious effects, although it may be necessary to increase the amount of first component to compensate for the presence of free polyether. As a practical matter, it is preferred that the amount of free polyether present in any first component be no more than about 30 percent by weight. More preferably, the amount of free polyether present in a first component will be no more than about 20 percent by weight.

The composition of the present invention also must contain a second component which is a hydrophobic fumed silica. The nature of the hydrophobic silica surface is not known to be critical. As with the first component, more than one second component or hydrophobic fumed silica can be employed in a given additive system, if desired.

In general, fumed silica is characterized by its extremely small particle size and large surface area. Molten spheres or primary particles of silica are produced by the hydrolysis of silicon tetrachloride vapor in a flame of hydrogen and oxygen. Such primary particles of silica typically have diameters in the range of from about 0,007 to about 0,027 micrometers. Upon their formation, however, such primary particles collide and fuse with one another to form branched, three-dimensional, chain-like aggregates. Some reversible mechanical agglomeration or entanglement also takes place as the aggregates cool below the fusion temperature of silica. Commercially available fumed silicas have particle sizes of from about 1 to roughly 80 micrometers, with the majority of the particles being in the 40–60 micrometer range. In use in the present invention, mechanical size reduction occurs as a result of a combination of melt extrusion temperatures with shearing forces which take place in the extruder and upon extrusion through the die. Such size reduction is believed to result in a particle size distribution ranging from about 1 to about 20 micrometers or so. The majority of the particles are believed to have sizes in the upper portion of the range, i.e., roughly 10–20 micrometers.

In general, fumed silicas typically have surface areas in the range of from about 80 to about 410 m$^2$/g. Fumed silicas are readily prepared by known methods; see, for example, by way of illustration only, U.S. Pat. Nos. 2,863,738 to Antwerp, 3,423,184 to Biegler et al., 3,642,453 to Chilton et al., 4,048,290 to Lee, and 4,292,290 to Tunison, III.

The surface of fumed silica has three chemical groups: (1) isolated hydroxy groups, (2) hydrogen-bonded hydroxy groups, and (3) siloxane groups. Thus, the surface generally is hydrophilic, although the siloxane groups are hydrophobic. The hydrophilic silica surface of a fumed silica, however, can be rendered hydrophobic by reacting surface hydroxy groups with a hydrophobic reagent. Suitable reagents include polydimethylsiloxane, dimethyldichlorosilane, hexamethyldisilazane, and the like. Indeed, these three reagents have been used commercially to produce hydrophobic fumed silicas which are available from the Cab-O-Sil Division of Cabot Corporation, Tuscola, Ill., as CAB-O-SIL ® TS-720, TS-610, and TS-530, respectively. However, the nature of the reagent employed is not known to be critical. It is expected that any reagent could be used which renders the fumed silica surface hydrophobic. See, by way of illustration, U.S. Pat. No. 4,849,022 to Kobayashi and Ohnishi.

The weight ratio of first component to second component generally will be in the range of from about 20 to about 300. However, the preferred weight ratios depend on the type of first component, that is, whether the first component is selected to provide a nonwoven web having improved tensile strength characteristics or a hydrophilic nonwoven web..

The additive system of the present invention can be prepared by any number of methods known to those having ordinary skill in the art. The additive system most often will be prepared by simply dispersing the second component in the first component.

The thermoplastic composition of the present invention also can be prepared by any number of methods known to those having ordinary skill in the art. For example, the polymer in chip or pellet form and the additive system can be mixed mechanically to coat the polymer particles with additive system. If desired, the additive system can be dispersed, or dissolved and dispersed in the case where the first component is soluble, in a suitable solvent to aid the coating process, although the use of a solvent is not preferred. The coated polymer then can be added to the feed hopper of the extruder from which the fibers will emerge.

Alternatively, the coated polymer can be charged to a heated compounder, such as a heated twin-screw compounder, in order to disperse the additive system throughout the bulk of the polymer. The resulting thermoplastic composition typically is extruded as rods which are fed to a chipper. The resulting chips (or pellets) then serve as the feed stock for a melt-processing extruder. In a variation of this procedure, the level of additive system present in the polymer is higher than that required in the polymer to be extruded into fibers. The additive system-containing polymer chips then are admixed with or metered into the polymer feed stock.

In another method, the additive system can be metered into the throat of the hopper which contains the polymer in particulate form and which feeds the extruder. In yet another method, the additive system can be metered directly into the barrel of the extruder where it is blended with the molten polymer as the resulting mixture moves toward the die.

Nonwoven Webs Having Improved Tensile Strength Characteristics

When the melt-extrudable thermoplastic composition of the present invention includes as part of the additive system a polysiloxane polyether first component having a molecular weight of from about 3,000 to about 18,000 and meets certain other criteria, a nonwoven web prepared from such composition typically is not wettable (hydrophilic), even though a polysiloxane polyether has been incorporated into the fibers. Therefore, it appears that such first component has not substantially migrated or segregated toward the surfaces of the fibers and that tensile strength improvements, unlike a surface phenomenon such as wettability, are not dependent upon the presence of such first component at or near the fiber surfaces.

TSI First Component

In preferred embodiments representing the use of a TSI first component or polysiloxane polyether, the sum of m and n is in the range of from about 4 to about 100, and x represents an integer of from 4 to about 25. In other preferred embodiments, the sum of m and n is from about 13 to about 23. In still other preferred embodiments, p is either 1 or 2, but most preferably is 2. In yet other preferred embodiments, x is from about 8 to about 16.

As already noted, the TSI first component will have a molecular weight of from about 3,000 to about 18,000. Preferably, the TSI first component molecular weight will be in the range of from about 3,000 to 10,000, and most preferably from about 3,000 to about 6,000.

In general, the TSI first component will be present in an amount of from about 0.1 to about 3 percent by weight, based on the amount of thermoplastic polyolefin. As a practical matter, TSI first component levels of from about 0.1 to about 1.5 percent by weight are preferred, with levels of from about 0.1 to about 0.5 percent by weight being most preferred.

With a TSI first component, the weight ratio of TSI first component to second component preferably will be in the range of from about 20 to about 60. The weight ratio of TSI first component to second component most preferably will be in the range of from about 25 to about 40.

Methods for Preparing a Nonwoven Web Having Improved Tensile Strength Characteristics In accordance with the present invention, a nonwoven web having improved tensile strength characteristics is prepared by the method which comprises:
(A) melting a thermoplastic composition which comprises a thermoplastic polyolefin and an additive system comprising a first component and a second component;

(B) forming fibers by extruding the resulting melt through a die;

(C) drawing said fibers; and (D) collecting said fibers on a moving foraminous surface as a web of entangled fibers; in which:

(1) said first component is a polysiloxane polyether having the general formula,

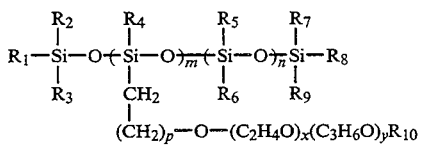

$$(CH_2)_p-O-(C_2H_4O)_x(C_3H_6O)_y R_{10}$$

in which:

(a) $R_1$–$R_9$ are independently selected monovalent $C_1$–$C_3$ alkyl groups;

(b) $R_{10}$ is hydrogen or a monovalent $C_1$–$C_3$ alkyl group;

(c) m represents an integer of from 1 to about 100;

(d) n represents an integer of from 0 to about 100;

(e) the sum of m and n is in the range of from about 4 to about 100;

(f) p represents an integer of from 0 to about 5;

(g) x represents an integer of from 4 to about 25;

(h) y represents an integer of from 0 to about 25;

(i) the ratio of x to y is equal to or greater than 2;

(j) said first component has a molecular weight of from about 3,000 to about 18,000; and (k) said first component is present in an amount of from about 0.1 to about 3 percent by weight, based on the amount of thermoplastic polyolefin; and (2) said second component is a hydrophobic fumed silica, in which the weight ratio of said first component to said second component is in the range of from about 20 to about 70.

In the first step of the method of the present invention, a thermoplastic composition which comprises a thermoplastic polyolefin and an additive system comprising a first component and a second component as already defined is melted. This typically is done in an extruder which is an integral part of the apparatus used to form fibers. The temperature and residence time in the extruder are dependent primarily on the thermoplastic polyolefin employed. Thus, such parameters can be determined readily by one having ordinary skill in the art without undue experimentation.

Fibers then are formed by extruding the molten mixture through a die. Although the nature of the die is not known to be critical, it most often will have a plurality of orifices arranged in one or more rows extending the full machine width. Such orifices may be circular or noncircular in cross-section.

The fibers then are drawn, typically by entraining them in a fluid stream having a sufficiently high velocity. When continuous fibers are produced, the fibers first are cooled in a quenching fluid which usually is low pressure air. The fluid stream which draws the fibers, usually air, can be a stream of high velocity air separate from the quenching fluid, or it can be a portion of the quenching fluid which is accelerated by passage into a narrow nozzle. In the production of substantially continuous fibers, on the other hand, the fluid stream usually is a heated, high velocity stream of air which draws the fibers while they are in an at least partially molten or softened state.

The drawn fibers then are collected on a moving foraminous surface as a web of entangled fibers. The foraminous surface can be, by way of example only, a revolving drum or a continuous belt or wire screen; the latter is most commonly used on commercial-scale equipment.

In general, the steps of melting, forming, drawing, and collecting are carried out as described in such processes as meltblowing, spunbonding, and the like. By way of illustration only, such processes are exemplified by the following references which are incorporated herein by reference:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al , "Manufacture of Superfine Organic Fibers" Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing - A One-Step Web Process for New Nonwoven Products", *Journal of the Technical Association of the Pulp and Paper Industry*, Vol. 56, No.4, pp. 74–77 (1973); and (b) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

If continuous fibers are formed, such as by a spunbonding process, the resulting web must be pattern bonded by the application of heat and pressure in order for the nonwoven web to exhibit improved tensile strength characteristics. Preferably, such application of heat and pressure will be in the ranges of from about 80° C. to about 180° C. and from about 150 to about 1,000 pounds per linear inch (59–178 kg/cm), respectively. More preferably, a pattern having from about 10 to about 250 bonds/inch$^2$ (1–40 bonds/cm$^2$) covering from about 5 to about 30 percent of the surface area of the nonwoven web will be employed.

Such pattern bonding is accomplished in accordance with known procedures. See, for example, U.S. Design Pat. No. 239,566 to Vogt, U.S. Design Pat. No. 264,512 to Rogers, U.S. Pat. No. 3,855,046 to Hansen et al., and U.S. Pat. No. 4,493,868, supra, for illustrations of bonding patterns and a discussion of bonding procedures.

A nonwoven web having improved tensile strength characteristics also is prepared by the method which comprises:

(A) melting a thermoplastic composition which comprises a thermoplastic polyolefin and an additive system comprising a first component and a second component;

(B) forming continuous fibers by extruding the resulting melt through a die;
(C) drawing said continuous fibers;
(D) collecting said continuous fibers into a tow;
(E) cutting said tow into staple fibers;
(F) laying said staple fibers onto a moving foraminous surface as a web of entangled fibers; and
(G) pattern bonding the resulting web of entangled fibers by the application of heat and pressure;

in which the first component and second component are as already defined.

Each of the foregoing steps is carried out as already described or by any of several means which are well known to those having ordinary skill in the art. If desired, individual continuous fibers can be false twisted before collecting them as a tow. Moreover, the tow can be crimped before cutting into staple-length fibers. Although the staple fibers can be laid onto the moving foraminous support by any known means, the fibers preferably will be either air-laid or wet-laid. Finally, the pattern bonding of the resulting nonwoven web can be by known means as already described hereinabove.

Hydrophilic or Wettable Nonwoven Webs

Wettable webs result from the inclusion in the composition to be melt-extruded of an additive system which comprises a first component which is a defined polysiloxane polyether having a molecular weight of from about 350 to about 1,200 and a second component which is a hydrophobic fumed silica. Moreover, such webs do not become significantly less wettable over time. Such webs, however, do not demonstrate significant tensile strength improvements. Because the webs are wettable, though, it is clear that a substantial proportion of the first component or polysiloxane polyether has migrated to or near the surfaces of the fibers of which the web is composed.

The use herein of the term "surface-segregatable" is consistence with its use in U.S. Pat. No. 4,923,914. Upon forming fibers by melt-extruding a composition of the present invention which contains an additive system comprising a surface-segregatable first component and a second component as defined herein, there is in such a fiber a differential, increasing concentration of the first component from the center to the surface thereof. The concentration of first component at or near the surface of the fiber is sufficient to render the normally hydrophobic polyolefin wettable by water; that is, the fiber has been rendered hydrophilic. Unless stated otherwise, the term "hydrophilic" will be used herein to mean water-wettable. Thus, there is a controlled migration or segregation of first component toward the surface of the fiber which results in a controllable, differential concentration of first component in the fiber. Because the concentration of first component in the center portion of the fiber typically will vary nonlinearly from the concentration of such component at or near the surface, this concentration difference is referred to herein as a differential concentration.

Surface-Segregatable First Component

In preferred embodiments representing the use of a surface-segregatable first component or polysiloxane polyether, m represents an integer of from 1 to about 4, n represents an integer of from 0 to about 3, the sum of m and n is in the range of from about 1 to about 4, x represents an integer of from 1 to about 10, and y represents an integer of from 0 to about 5. In other preferred embodiments, m is either 1 or 2. In still other preferred embodiments, p is either 1 or 2, but most preferably is 2. In yet other preferred embodiments, y is 0 and x is 7 or 8.

Preferably, n will be 0, in which case the surface-segregatable first component or polysiloxane polyether will have the general formula,

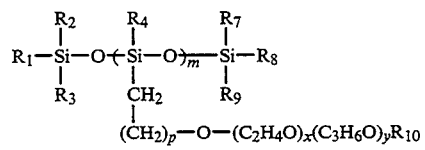

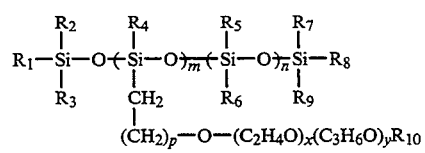

in which each of $R_1$-$R_4$, $R_7$-$R_9$, m, p, x, and y are as already defined.

While the surface-segregatable first component molecular weight can vary from about 350 to about 1,200, it preferably will not exceed about 1,000. Most preferably, the molecular weight will be in the range of from about 350 to about 700.

In general, the surface-segregatable first component will be present in an amount of from about 0.35 to about 3 percent by weight, based on the amount of thermoplastic polyolefin. As explained earlier, however, the presence of the second component in the additive system permits the reduction of the amount of surface-segregatable first component employed without sacrificing wettability. Since amounts of surface-segregatable first component greater than about 1 percent by weight yield wettable webs in the absence of the second component, levels of surface-segregatable first component of no more than about 1 percent are preferred. Thus, the preferred range for the surface-segregatable first component is from about 0.35 to about 1 percent by weight, based on the amount of polyolefin. Surface-segregatable first component levels of from about 0.35 to about 0.7 percent by weight are more preferred, with levels of from about 0.35 to about 0.5 percent by weight being most preferred.

With a surface-segregatable first component or polysiloxane polyether, the weight ratio of surface-segregatable first component to second component preferably will be in the range of from about 30 to about 100.

While the mechanism by which the second component interacts with a surface-segregatable first component or polysiloxane polyether is not known, there clearly is a synergistic effect which results from the inclusion in the composition of the present invention of both a surface-segregatable first component and a second component as defined herein. The ability of the second component to permit up to an approximately fifty percent reduction in the amount of surface-segregatable first component required to render the resulting nonwoven web wettable is even more remarkable and unexpected when one considers both the nature of the second component and the very small amounts of second component employed.

It is important to note that the wettable nonwoven webs prepared in accordance with the present invention are immediately wettable, notwithstanding the low levels of surface-segregatable first component which are employed. Moreover, such webs are wettable without the need for a post-formation treatment of any kind, such as gently heating the web as described in U.S. Pat. No. 4,857,251 to Nohr and MacDonald or a blooming procedure such as that described in U.S. Pat. Nos. 3,973,068 and 4,070,218 to Weber. Finally, such webs remain wettable for at least two years at ambient temperature.

Methods for Preparing a Wettable Nonwoven Web

A wettable nonwoven web which (i) is wettable immediately after its formation without any post-formation treatment, (ii) remains wettable after its formation for at least two years at ambient temperature, and (iii) employs a reduced amount of surface-segregatable first component, is prepared by the method which comprises:

(A) melting a thermoplastic composition which comprises a thermoplastic polyolefin and an additive system comprising a surface-segregatable first component and a second component;
(B) forming fibers by extruding the resulting melt through a die at a shear rate of from about 50 to about 30,000 sec$^{-1}$ and a throughput of no more than about 5.4 kg/cm/hour;
(C) drawing said fibers; and
(D) collecting said fibers on a moving foraminous surface as a web of entangled fibers; in which:
  (1) said surface-segregatable first component is a polysiloxane polyether having the general formula,

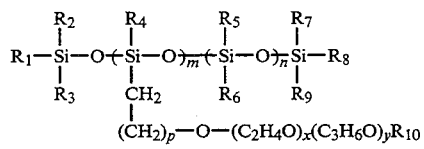

(CH$_2$)$_p$—O—(C$_2$H$_4$O)$_x$(C$_3$H$_6$O)$_y$R$_{10}$ in which:
  (a) R$_1$–R$_9$ are independently selected monovalent C$_1$–C$_3$ alkyl groups;
  (b) R$_{10}$ is hydrogen or a monovalent C$_1$–C$_3$ alkyl group;
  (c) m represents an integer of from 1 to about 4;
  (d) n represents an integer of from 0 to about 3;
  (e) the sum of m and n is in the range of from 1 to about 4;
  (f) p represents an integer of from 0 to about 5;
  (g) x represents an integer of from 1 to about 10;
  (h) y represents an integer of from 0 to about 5;
  (i) the ratio of x to y is equal to or greater than 2;
  (j) said surface-segregatable first component has a molecular weight of from about 350 to about 1,200; and
  (k) said surface-segregatable first component is present in an amount of from about 0.35 to about 3 percent by weight, based on the amount of thermoplastic polyolefin; and
(2) said second component is a hydrophobic fumed silica, in which the weight ratio of said surface-segregatable first component to said second component is in the range of from about 20 to about 300.

A wettable nonwoven web which (i) is wettable immediately after its formation without any post-formation treatment, (ii) remains wettable after its formation for at least two years at ambient temperature, and (iii) employs a reduced amount of surface-segregatable first component, also is prepared by the method which comprises:

(A) melting a thermoplastic composition which comprises a thermoplastic polyolefin and an additive system comprising a surface-segregatable first component and a second component;
(B) forming continuous fibers by extruding the resulting melt through a die at a shear rate of from about 50 to about 30,000 sec$^{-1}$ and a throughput of no more than about 5.4 kg/cm/hour;
(C) drawing said continuous fibers;
(D) collecting said continuous fibers into a tow;
(E) cutting said tow into staple fibers;
(F) laying said staple fibers onto a moving foraminous surface as a web of entangled fibers; and
(G) pattern bonding the resulting web of entangled fibers by the application of heat and pressure; in which the surface-segregatable first component and second component are as already defined.

Each of the steps in the foregoing two methods is carried out as already described or by any of several means which are well known to those having ordinary skill in the art. In general, the shear rate will be in the range of from about 50 to about 30,000 sec$^{-1}$. Preferably, the shear rate will be in the range of from about 150 to about 5,000 sec$^{-1}$, and most preferably from about 300 to about 2,000 sec$^{-1}$.

Throughput typically will be in the range of from about 0.01 to about 5.4 kg/cm/hour. Preferably, throughput will be in the range from about 0.1 to about 4.0 kg/cm.hour. The throughput most preferably will be in the range of from about 0.5 to about 2.5 kg/cm/hour.

The present invention is further described by the examples which follow. Such examples, however, are not to be construed as limiting in any way either the spirit or scope of the present invention. In the examples, all parts are by weight unless stated otherwise. For convenience, the examples are separated into two groups, with the first group employing TSI first components or polysiloxane polyethers and the second group employing surface-segregatable first components or polysiloxane polyethers.

GROUP I EXAMPLES

TSI FIRST COMPONENTS

Example 1

Preparation of Spunbonded Webs

Spunbonded nonwoven webs were prepared on a pilot-scale apparatus essentially as described in U.S. Pat. No. 4,340,563, which is incorporated herein by reference.

The thermoplastic polyolefin employed was Escorene 3445 polypropylene (Exxon Chemical Americas, Houston, Tex. 77079). According to the manufacturer, the polymer has a density of 0.90 g/cc and a melt flow rate of 35 g/10 minutes.

The TSI first component was a polysiloxane polyether having the formula,

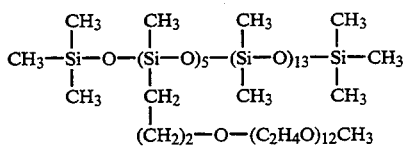

$(CH_2)_2-O-(C_2H_4O)_{12}CH_3$

The second component was CAB-O-SIL® TS-720, a hydrophobic fumed silica supplied by Cab-O-Sil Division, Cabot Corporation, Tuscola, Ill.

The second component was dispersed in the TSI first component at a weight ratio of 1:30 (first component ÷ second component) by means of a Henschel Fluidizing Mixer (250-liter capacity, Thyssen Henschel, 3500 Kassel 2 Postfach 102969, Germany). The mixer was run at 1,500 rpm for less than 30 seconds. Some care was required in order to minimize the entrapment of air. The resulting additive system preferably is allowed to stand for a minimum of about 12 hours before use to permit the additive system viscosity to stabilize.

The additive system was metered (pumped) into a twin-screw extruder downstream from the extruder feed hopper at a rate equivalent to 3 percent by weight, based on the amount of polypropylene. The pumping rate of the additive system, the weight of the additive system container, and the polymer feed rate were monitored in order to control the level of additive system in the polymer. The resulting molten blend of polymer, first component, and second component was extruded as a plurality of rods 2–3 mm in diameter. The rods were passed through a water bath, air dried, and pelletized. The additive system level in the resulting pellets was confirmed by elemental analysis for silicon. The pellets, referred to hereinafter as 3 percent concentrate pellets, were stored in plastic-lined boxes.

Five different spunbonded webs having basis weights of about 47 grams per square meter (gsm) were prepared:

(1) a control web prepared from virgin polypropylene;
(2) a web prepared from a mixture of 1.36 kg of 3 percent concentrate pellets and 18.6 kg of virgin polypropylene;
(3) a web prepared from a mixture of 1.81 kg of 3 percent concentrate pellets and 18.1 kg of virgin polypropylene;
(4) a control web prepared from polypropylene containing 1 percent by weight, based on the amount of polymer, of a phthalocyanine dye (Pigment SCC4402, Standridge Color Corp., Social Circle, Ga.); and
(5) a web prepared from a mixture of 1.36 kg of 3 percent concentrate pellets and 18.6 kg of polypropylene containing 1 percent by weight, based on the amount of polymer, of a phthalocyanine dye (Pigment SCC4402).

The compositions from which the webs were prepared are summarized in Table 1-1. In the table, the amount of polymer includes polymer present in the concentrate pellets without correcting for the amounts of first component and second component present. All other values are calculated values since each web was prepared from concentrate pellets rather than by the direct addition of additive system to virgin polymer.

TABLE 1-1

Summary of the Compositions of the Spunbonded Webs of Example 1

| Web | Kg. Polymer | Grams Additive System | Grams 1st Comp. | Wt.-% 1st Comp. | Grams 2d Comp. |
|---|---|---|---|---|---|
| 1 | 20.0 | None | None | None | None |
| 2 | 20.0 | 40.8 | 39.5 | 0.20 | 1.3 |
| 3 | 20.0 | 54.4 | 52.6 | 0.26 | 1.8 |
| 4 | 20.0[a] | None | None | None | None |
| 5 | 20.0[a] | 40.8 | 39.5 | 0.20 | 1.3 |

[a]The polypropylene contained 1 percent by weight, based on the amount of polymer, of a phthalocyanine dye (Pigment SCC4402, Standridge Color Corp., Social Circle, Georgia).

The more significant process variables for the spunbonding process generally were as follows:
extruder temperature, 210°–222° C.;
melt inlet temperature, 233°–236° C.;
throughput, 29 kg per hour (0.8 grams per hole per minute);
spin head temperature, 228°–233° C.;
pump block temperature, 231°–236° C.;
pack temperature, 246° C.;
pack pressure, 350 psig; and
melt temperature, 223°–224° C.

Each web was thermally pattern bonded at about 138°–140° C. and about 12 psi. The pattern employed had 123 bonds/inch$^2$ (19 bonds/cm$^2$) covering about 16.9 percent of the web surface area. It appeared, however, that bonding conditions were not consistent for all five webs.

Mean peak energy and peak load values for each web were determined in accordance with Federal Test Method 5100 (Standard No. 191A). The apparatus employed was an Instron Model 1122 Universal Testing Instrument with an Instron Micron II Desk Top Console Integrator (Instron Corporation, Canton, Mass.). The jaw span gap was 3 inches (7.6 cm) and web sample dimensions were 3"×6" (7.62 cm ×15.2 cm). In general, at least ten samples from each web were run. Each web was tested in both the machine direction (MD) and the cross direction (CD). The data are summarized in Table 1-2. In order to aid in the visualization of the extent of improvement or increase in mean peak energy and peak load values which resulted from the presence of the first component and second component, Table 1-2 includes "Percent Increase" columns after the "Peak Energy" and "Peak Load" columns, in each case, the percent increase (PI) was calculated by subtracting the control value from the value obtained from the inclusion of the additive system in the polymer from which the web was prepared, dividing the difference by the control value, and multiplying the quotient by 100; i.e., PI=100 x (improved value−control value)/control value.

TABLE 1-2

Tensile Strength Characteristics for the Webs of Example 1

| Web | Direction | Peak Energy (m-kgF) | Percent Increase | Peak Load (kgF) | Percent Increase |
|---|---|---|---|---|---|
| 1 | MD | 0.109 | — | 11.0 | — |
|   | CD | 0.070 | — | 7.7 | — |
| 2 | MD | 0.391 | 259 | 17.4 | 58 |
|   | CD | 0.235 | 236 | 10.4 | 35 |
| 3 | MD | 0.208 | 91 | 13.3 | 21 |
|   | CD | 0.239 | 241 | 10.5 | 36 |
| 4 | MD | 0.092 | — | 9.6 | — |
|   | CD | 0.082 | — | 6.6 | — |

TABLE 1-2-continued

Tensile Strength Characteristics for the Webs of Example 1

| Web | Direction | Peak Energy (m-kgF) | Percent Increase | Peak Load (kgF) | Percent Increase |
|---|---|---|---|---|---|
| 5 | MD | 0.324 | 252 | 15.8 | 65 |
|   | CD | 0.366 | 346 | 12.5 | 89 |

In spite of the difficulties in maintaining the same bonding conditions for all of the webs, it is clear from Table 1-2 that the use of the additive system in accordance with the present invention results in significant increases in the tensile strength characteristics of the nonwoven webs. In general, the improvements are more pronounced in the machine direction, although the improvements in the cross direction are substantial.

Figure 2:
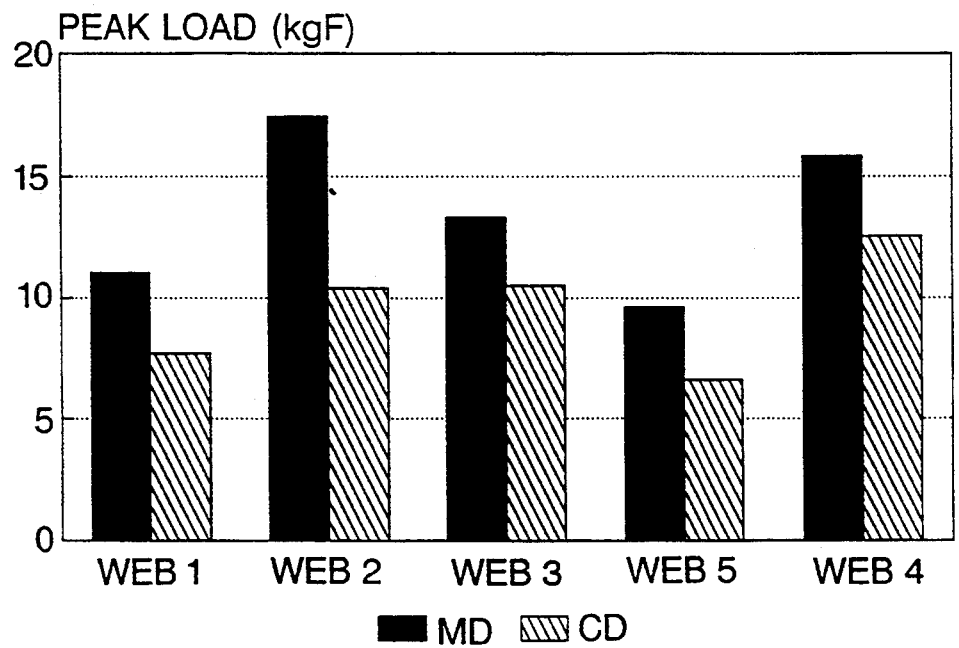

To aid in the visualization of the improvements demonstrated by the data in Table 1-2, the peak energy data and peak load data have been plotted as bar graphs in FIGS. 1 and 2, respectively. Both the machine direction value and the cross direction value for each web are included in each figure. It is clear from FIGS. 1 and 2 that peak energy is more sensitive to the inclusion in the polymer of the additive system. That is, for any given web of the present invention, peak energy values are increased significantly more than are peak load values. Finally, the presence of the dye in web 5 not only did not have a deleterious effect on the improvement of tensile strength characteristics, but also may have contributed to a significant improvement in both peak energy and peak load values in the cross direction.

Example 2 Preparation of Spunbonded webs

The procedure of Example 1 was repeated, except that the concentrate pellets were prepared with Type PF-301 polypropylene (Himont Incorporated, Wilmington, Del.). According to the manufacturer, the polymer has a melt flow rate of 35 g/10 minutes. The number-average molecular weight is 50,000 and the weight-average molecular weight is 150,000. Thus, the polydispersity of the polymer is 3.0. In addition, the concentrate pellets contained 3.3 percent by weight of the additive system, rather than 3 percent by weight. In each case, the weight ratio of TSI first component to second component was 31.

Again, five different spunbonded webs having basis weights of about 47 grams per square meter (gsm) were prepared:

(1) a control web prepared from virgin Escorene 3445 polypropylene;
(2) a control web prepared from a mixture of 1.36 kg of Type PF-301 polypropylene and 18.6 kg of Escorene 3445 polypropylene;
(3) a web prepared from a mixture of 1.36 kg of 3.3 percent concentrate pellets and 18.6 kg of Escorene 3445 polypropylene;
(4) a web prepared from a mixture of 1.36 kg of 3.3 percent concentrate pellets and 18.6 kg of Escorene 3445 polypropylene containing 3 percent by weight, based on the amount of polymer, of titanium dioxide; and
(5) a web prepared from a mixture of 1.36 kg of 3 percent concentrate pellets and 18.6 kg of Escorene 3445 polypropylene containing 1 percent by weight, based on the amount of polymer, of a phthalocyanine dye (Pigment SC 4402).

The compositions from which the webs were prepared are summarized in Table 2-1.

TABLE 2-1

Summary of the Compositions of the Spunbonded Webs of Example 2

| Web | Kg. Polymer | Grams Additive System | Grams 1st Comp. | Wt.-% 1st Comp. | Grams 2d Comp. |
|---|---|---|---|---|---|
| 1 | 20.0[a] | None | None | None | None |
| 2 | 20.0[b] | None | None | None | None |
| 3 | 20.0[b] | 44.9 | 43.5 | 0.22 | 1.4 |
| 4 | 20.0[c] | 44.9 | 43.5 | 0.22 | 1.4 |
| 5 | 20.0[d] | 44.9 | 43.5 | 0.22 | 1.4 |

[a] The polypropylene consisted entirely of Escorene 3445.
[b] The polypropylene consisted of 1.36 kg of Type PF-301 polypropylene and 18.6 kg of Escorene 3445.
[c] The polypropylene consisted of 1.36 kg of Type PF-301 polypropylene and 18.6 kg of Escorene 3445 containing 3 percent by weight of titanium dioxide.
[d] The polypropylene consisted of 1.36 kg of Type PF-301 polypropylene and 18.6 kg of Escorene 3445 containing 1 percent by weight of a phthalocyanine dye (Pigment SC 4402).

Mean peak energy and peak load values were determined as before. The data are summarized in Table 2-2. In the table, all percent increase values were calculated in relation to web 2 since web 1 did not contain any Type PF-301 polypropylene.

TABLE 2-2

Tensile Strength Characteristics for the Webs of Example 2

| Web | Direction | Peak Energy (m-kgF) | Percent Increase | Peak Load (kgF) | Percent Increase |
|---|---|---|---|---|---|
| 1 | MD | 0.111 | — | 11.2 | — |
|   | CD | 0.071 | — | 7.9 | — |
| 2 | MD | 0.113 | — | 11.5 | — |
|   | CD | 0.084 | — | 9.2 | — |
| 3 | MD | 0.364 | 222 | 17.3 | 50 |
|   | CD | 0.340 | 305 | 12.4 | 35 |
| 4 | MD | 0.291 | 158 | 15.7 | 71 |
|   | CD | 0.300 | 257 | 13.1 | 42 |
| 5 | MD | 0.166 | 47 | 12.9 | 12 |
|   | CD | 0.187 | 123 | 10.4 | 13 |

Figure 3:
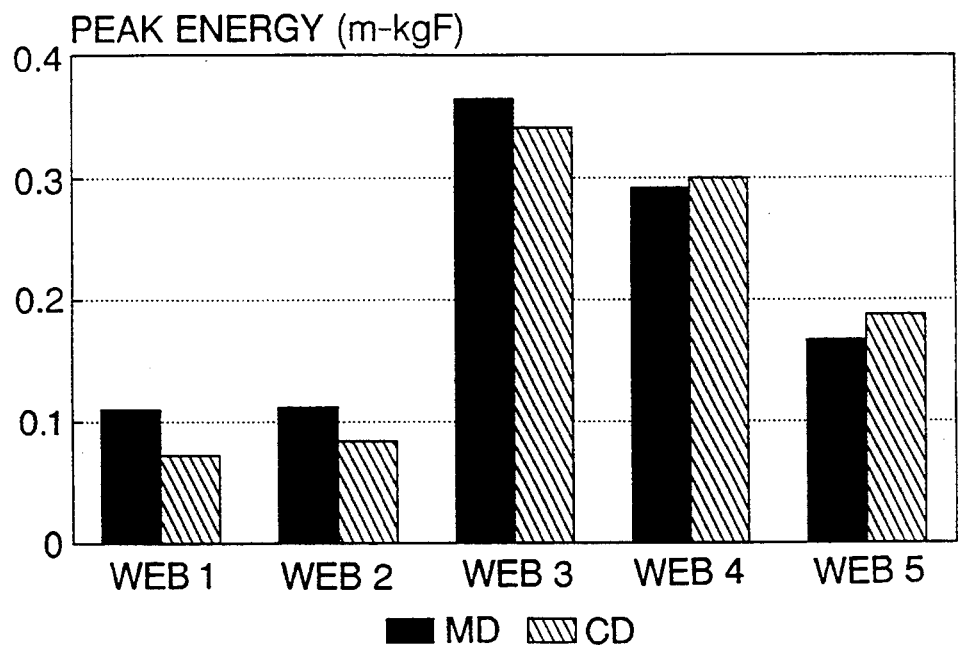
Figure 4:
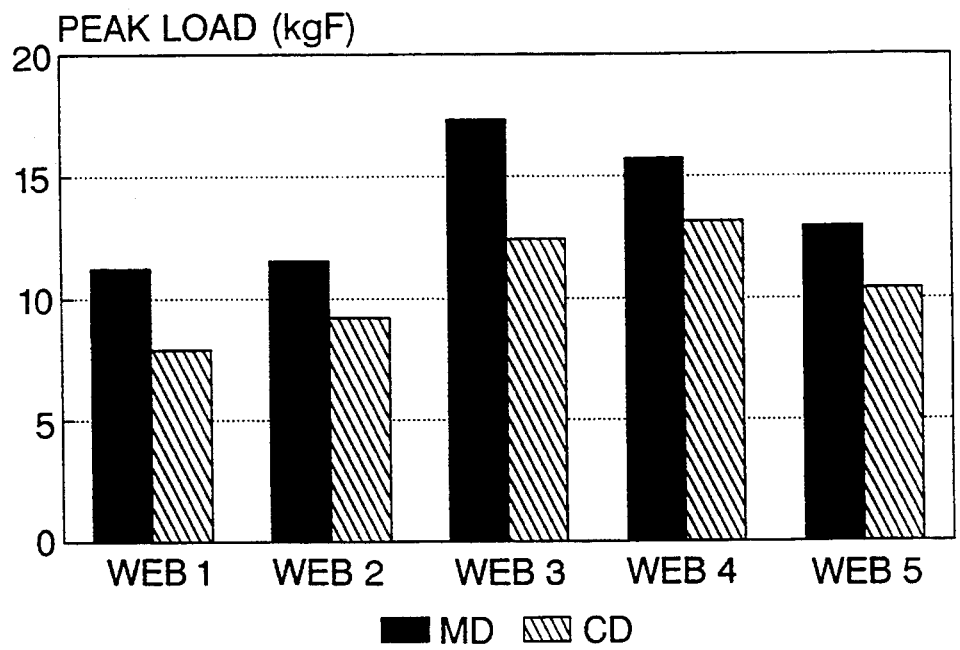

Results similar to those of Example 1 were obtained. As with Example 1, the peak energy data and peak load data of Table 2-2 have been plotted as bar graphs in FIGS. 3 and 4, respectively. It is not understood, however, why the improvements in tensile strength characteristics observed for web 5 were reduced in comparison with the improvements for web 3.

Example 3 Preparation of Spunbonded Webs

The procedure of Example 1 was repeated in order to examine the effect of increasing concentrations of additive system. This time four different spunbonded webs having basis weights of about 47 grams per square meter (gsm) were prepared:

(1) a web prepared from a mixture of 1.13 kg of 3 percent concentrate pellets and 18.8 kg of virgin polypropylene;
(2) a web prepared from a mixture of 1.36 kg of 3 percent concentrate pellets and 18.6 kg of virgin polypropylene;
(3) a web prepared from a mixture of 1.59 kg of 3 percent concentrate pellets and 18.4 kg of virgin polypropylene; and
(4) a web prepared from a mixture of 1.81 kg of 3 percent concentrate pellets and 18.1 kg of virgin polypropylene;

The compositions from which the webs were prepared are summarized in Table 3-1.

TABLE 3-1

Summary of the Compositions of the Spunbonded Webs of Example 3

| Web | Kg. Polymer | Grams Additive System | Grams 1st Comp. | Wt.-% 1st Comp. | Grams 2d Comp. |
|---|---|---|---|---|---|
| 1 | 20.0 | 34.0 | 32.9 | 0.16 | 1.1 |
| 2 | 20.0 | 40.8 | 39.5 | 0.20 | 1.3 |
| 3 | 20.0 | 47.6 | 46.1 | 0.23 | 1.5 |
| 4 | 20.0 | 54.4 | 52.6 | 0.26 | 1.8 |

Mean peak energy and peak load values were determined as before. The data are summarized in Table 3-2 which includes the control of Example 1 (web 1) as web C since it was found that control values were essentially constant.

TABLE 3-2

Tensile Strength Characteristics for the Webs of Example 3

| Web | Direction | Peak Energy (m-kgF) | Percent Increase | Peak Load (kgF) | Percent Increase |
|---|---|---|---|---|---|
| C | MD | 0.109 | — | 11.0 | — |
|   | CD | 0.070 | — | 7.7 | — |
| 1 | MD | 0.386 | 254 | 14.5 | 32 |
|   | CD | 0.276 | 294 | 9.9 | 29 |
| 2 | MD | 0.455 | 317 | 15.5 | 41 |
|   | CD | 0.524 | 649 | 12.9 | 68 |
| 3 | MD | 0.442 | 306 | 15.2 | 38 |
|   | CD | 0.566 | 709 | 12.7 | 65 |
| 4 | MD | 0.331 | 204 | 14.3 | 30 |
|   | CD | 0.483 | 590 | 11.8 | 53 |

Figure 5:
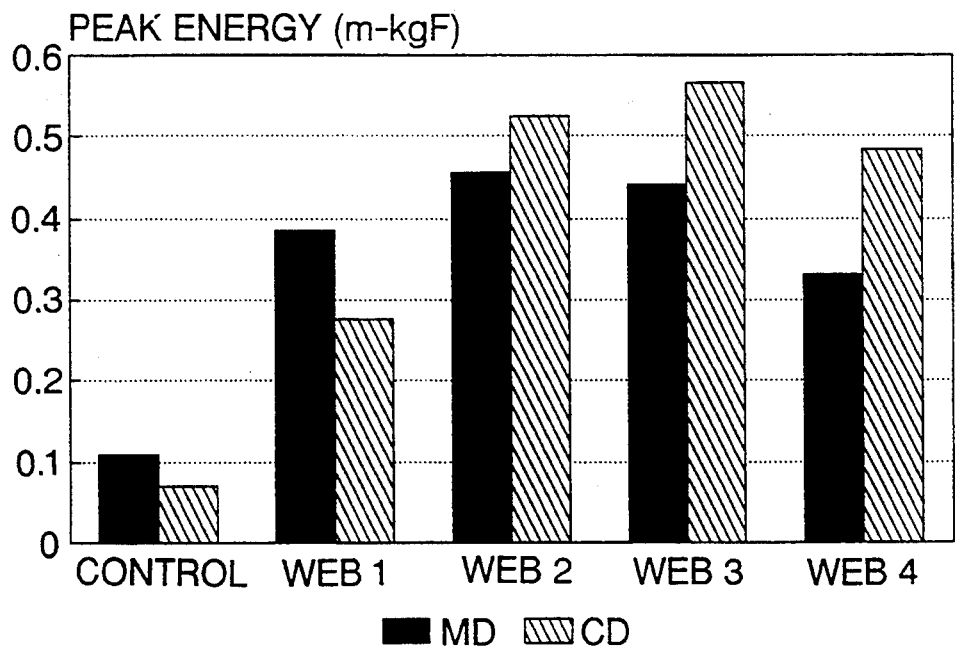
Figure 6:
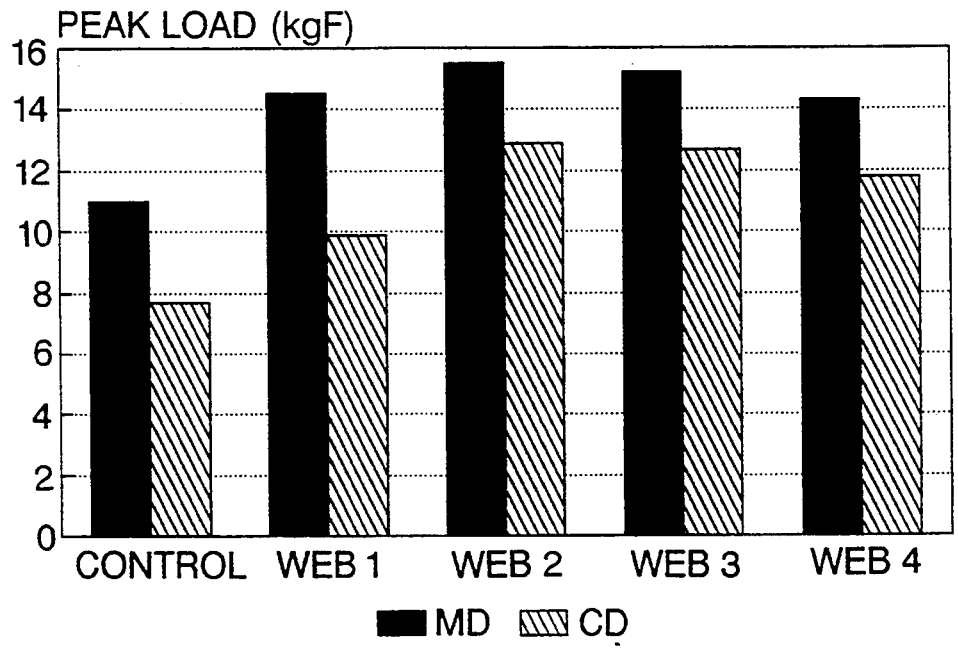

Results similar to those of Example 1 were obtained. It may be noted that the webs of Example 3 resulted in very high percent increases in peak energy values. As with Example 1, the peak energy data and peak load data of Table 3-2 have been plotted as bar graphs in FIGS. 5 and 6, respectively. From FIG. 5, it appears that machine direction peak energy is at a maximum in web 2, whereas cross direction peak energy is at a maximum in web 3. Thus, for the combination of first component, second component, and polyolefin employed, the most preferred range for the first component is from about 0.20 to about 0.23 percent by weight, based on the amount of polyolefin. Peak load, on the other hand, appears to maximize for both the machine direction and the cross direction in web 2 which has a first component concentration of 0.20 weight percent.

Example 4 Preparation of Meltblown Webs

Meltblown webs were prepared on a commercial meltblowing line essentially as described in U.S. Pat. Nos. 3,849,241 to Buntin et al. and 4,663,220 to Wisneski et al. The process employed the polymer, first component, and second component described in Example 1. In this case, however, the concentrate pellets contained 13 percent by weight of the additive system of Example 1. The feed rates for the concentrate pellets were selected to introduce the concentrate pellets into the extruder at levels of 2 and 4 percent by weight, respectively, based on the amount of polypropylene being meltblown. The levels were calculated to yield first component levels of about 0.24 and 0.48 percent by weight, respectively, based on the amount of polypropylene. A control web containing neither first component nor second component also was prepared. Each web had a basis weight of about 31 gsm. Because the mill at which the webs were prepared was not set up to run peak energy and peak load measurements, trap tear tests were conducted instead. Such tests were carried out according to ASTM Test Method D-1117-14. The results are summarized in Table 4-1.

TABLE 4-1

Summary of Trap Tear Results for the Meltblown Webs of Example 4

| Web | Direction | Percent 1st Comp. | Trap Tear (kg) | Percent Increase |
|---|---|---|---|---|
| 1 | MD | 0 | 0.49 | — |
|   | CD | 0 | 0.44 | — |
| 2 | MD | 0.24 | 0.51 | 4 |
|   | CD | 0.24 | 0.46 | 5 |
| 3 | MD | 0.48 | 0.78 | 59 |
|   | CD | 0.48 | 0.82 | 86 |

Figure 7:
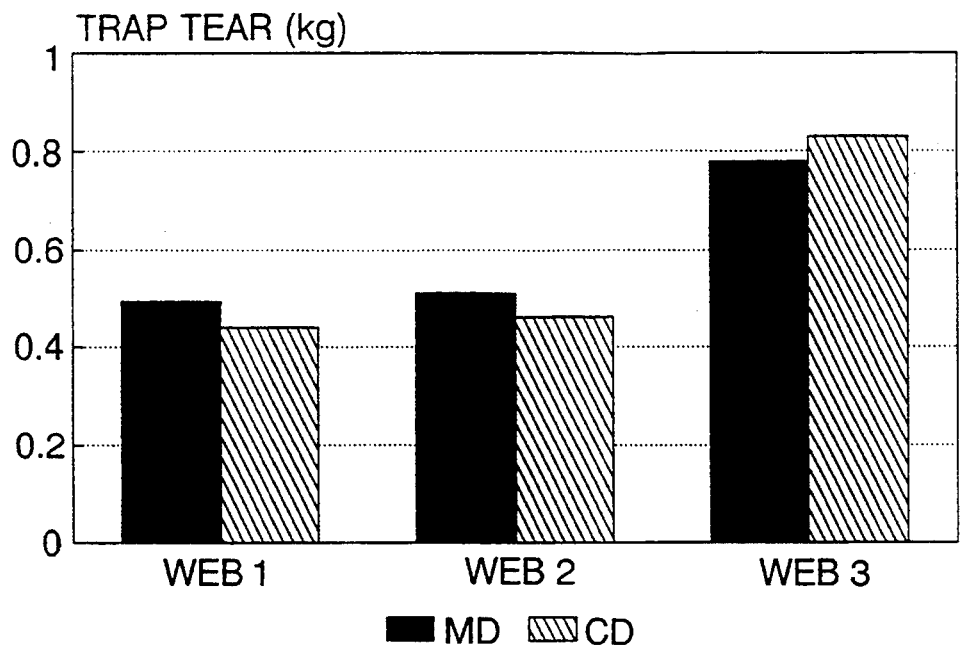

While there is not a known, direct correlation between trap tear results and either peak energy or peak load values, it is known that when trap tear increases, peak energy and peak load values also increase. Thus, even in the absence of peak energy and peak load measurements, it is clear that the inclusion of the first component and second component in the meltblown webs resulted in improved tensile strength characteristics. Consistent with the practice in the preceding examples, the data of Table 4-1 were plotted as a bar graph in FIG. 7. Although the percent increase in trap tear at a first component level of 0.24 percent by weight was not substantial, a significant increase at a first component level of 0.48 percent by weight was observed, especially in the cross direction.

Example 5 Preparation of Spunbonded Webs

Spunbonded webs were prepared on a commercial spunbonding line essentially as described in U.S. Pat. Nos. 3,341,394 to Kinney and 3,655,862 to Dorschner et al. The process employed the additive system described in Example 1.

In this case, the polymer was the Himont Type PF-301 described in Example 2. The polymer contained 0.5 weight percent, based on the amount of polymer, of Pigment SCC4402, Standridge Color Corp., Social Circle, Ga. The polymer also contained 0.7 percent by weight, based on the amount of polymer, of an isooctyl-phenylpolyethoxyethanol surfactant (TRITON ® X-102, Rohm and Haas Company, Philadelphia, Pa.).

Concentrate pellets containing 3 percent by weight of additive system were prepared as described in Example 1. The feed rates for the concentrate pellets were selected to introduce the concentrate pellets into the extruder at levels of 7 and 9 percent by weight, respectively, based on the amount of polypropylene being meltblown. The levels were calculated to yield first component levels of about 0.21 and about 0.27 percent by weight, respectively, based on the amount of polypropylene. A control web containing neither first component nor second component also was prepared (web 1). Each web had a basis weight of about 19 gsm. Problems with web formation were encountered at the 9 percent feed rate, although fiber formation appeared to be satisfactory. Consequently, a web at the 9 percent feed rate was not obtained.

Because the mill at which the webs were prepared was not set up to run peak energy measurements, peak load and trap tear measurements were conducted instead as already described. The results are summarized in Tables 5-1 and 5-2.

TABLE 5-1

Summary of Peak Load Results for the Spunbonded Webs of Example 5

| Web | Direction | Percent 1st Comp. | Peak Load (kgF) | Percent Increase |
|---|---|---|---|---|
| 1 | MD | 0 | 4.22 | — |
|   | CD | 0 | 5.21 | — |
| 2 | MD | 0.21 | 4.67 | 11 |
|   | CD | 0.21 | 5.91 | 13 |

TABLE 5-2

Summary of Trap Tear Results for the Spunbonded Webs of Example 5

| Web | Direction | Percent 1st Comp. | Trap Tear (kg) | Percent Increase |
|---|---|---|---|---|
| 1 | MD | 0 | 1.89 | — |
|   | CD | 0 | 2.38 | — |
| 2 | MD | 0.21 | 2.08 | 10 |
|   | CD | 0.21 | 3.04 | 28 |

Figure 8:
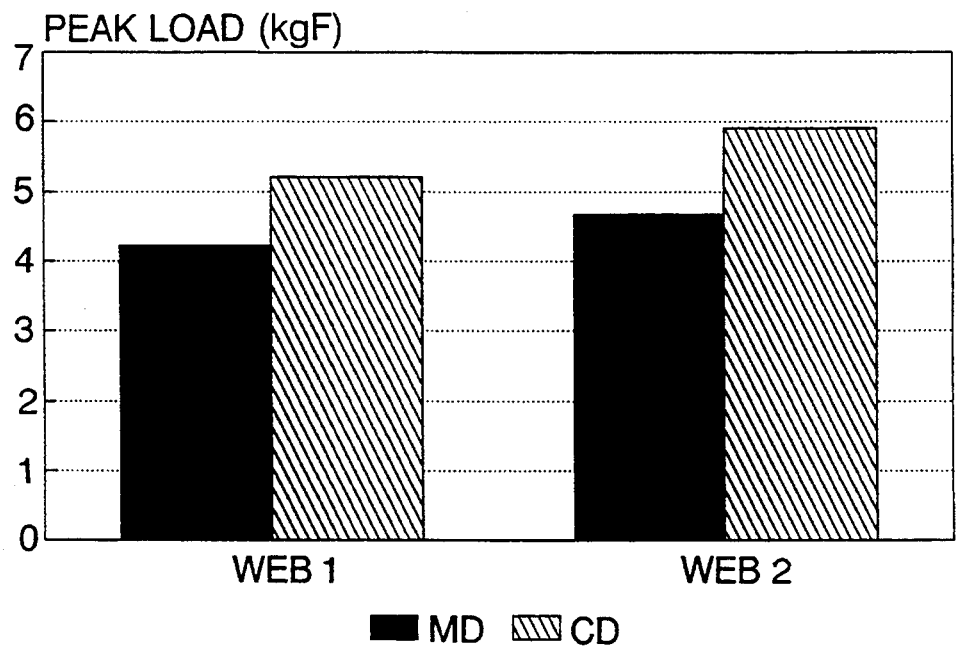
Figure 9:
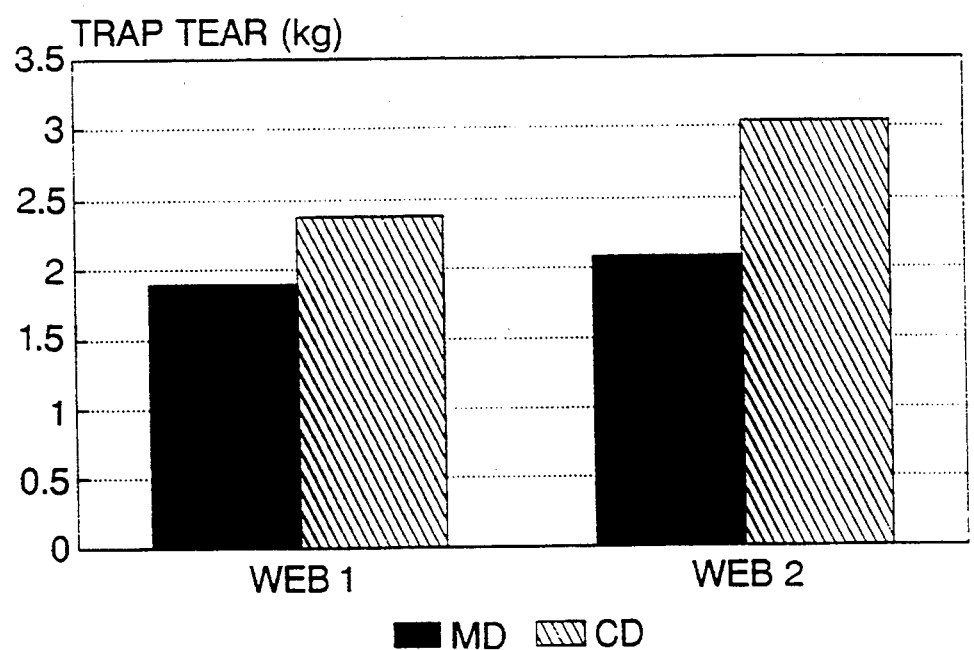

The data of Tables 5-1 and 5-2 were plotted as bar graphs in FIGS. 8 and 9, respectively.

Since most applications of nonwoven fabrics requiring improved tensile strength characteristics also typically have been thermally pattern bonded as described herein, the behavior under stress of many of the control webs and webs of the present invention was examined. Scanning electron photomicrographs of the webs also were studied. The photomicrographs (FIGS. 10 and 11) were obtained at Surface Science Laboratories, Inc., Mountain View, Calif. with a Camscan Series 4 Scanning Electron Microscope (Camscan, Cambridge, England). The parameters used were as follows: a 30 degree tilt, a magnification of 20×, and a 10 keV beam voltage.

Figure 10:
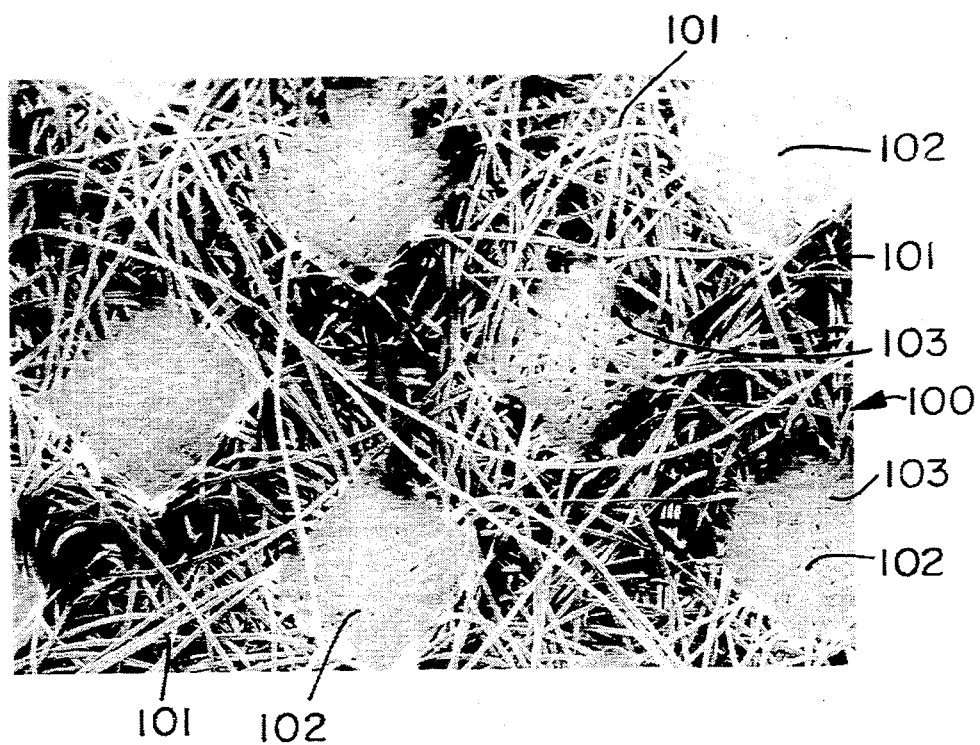
FIGS. 10 and 11 are scanning electron photomicrographs of spunbonded nonwoven webs which have been pattern bonded by the application of heat and pressure. The web of FIG. 10 is a control web while the web of FIG. 11 is a web prepared in accordance with the present invention.
Figure 11:
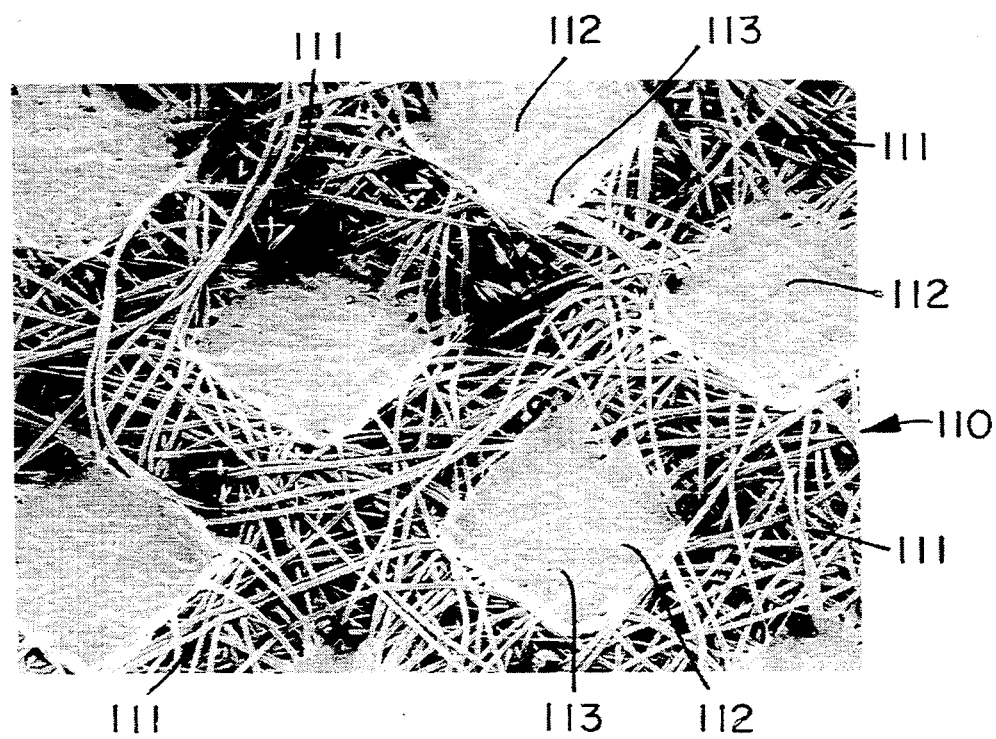

FIG. 10 is a photomicrograph of a spunbonded control web and FIG. 11 is that of a spunbonded web of the present invention. Each web was thermally pattern bonded as described herein under essentially identical conditions. In web 100 of FIG. 10, the web is composed of a plurality of randomly laid fibers 101 which have been thermally bonded at a plurality of sites 102. The extent of melting at bonding sites 102 generally is incomplete; note that in all of the sites voids 103 still are present. Similarly, FIG. 11 shows web 110 which is composed of fibers 111 bonded at sites 112 which, in turn, show only a few randomly located voids 113.

The scales of FIGS. 10 and 11 are not identical, which makes direct visual comparisons difficult. In FIG. 10, 1000 microns is equal to about 20.0 mm, whereas in FIG. 11 the same distance is equal to about 21.5 mm. It was estimated that the sides of the bond points in FIG. 10 were in the range of 1000–1100 microns, whereas the sides of the bond points in FIG. 11 were in the range of 930–1160 microns.

In addition to the foregoing differences in appearance, the two webs behaved very differently under stress. When stress was applied to each web until the web tore, it was observed with the control web (i.e., web 100 of FIG. 10) that failure tended to occur at and within the bond points, rather than with the fibers. On the other hand, with the web of the present invention (i.e., web 110 of FIG. 11), the bond points stayed intact, with the fibers elongating and then breaking.

GROUP II EXAMPLES
SURFACE-SEGREGATABLE FIRST COMPONENTS

Example 6 Preparation of Spunbonded Webs

Spunbonded nonwoven webs were prepared on a pilot-scale apparatus essentially as described in U.S. Pat. No. 4,340,563, which is incorporated herein by reference. The thermoplastic polyolefin employed was the Escorene 3445 polypropylene employed in Example 1.

The first component was a trisiloxane polyether supplied by Union Carbide Corporation, Danbury, Conn. The material has the formula,

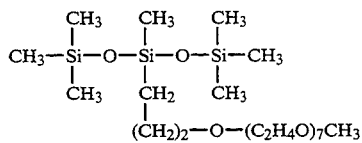

The material has a theoretical molecular weight of 602. Based on gel permeation chromatography studies (American Polymer Standards Corporation, Mentor, Ohio) relative to PDMS standards, the following average molecular weights were calculated:

| | |
|---|---|
| Weight-average molecular weight: | 557 |
| Number-average molecular weight: | 480 |
| Z-average molecular weight: | 614 |
| Polydispersity: | 1.16 |

The material contained an estimated 7.8 percent low molecular weight material, based on total peak area and main peak area comparisons, and an estimated 20–25 percent free polyether.

Three g ($1.5 \times 10^{-2}$ weight percent, based on the amount of polypropylene) of second component, CAB-O-SIL® TS-720, was dispersed in 90 g (0.45 weight percent, based on the amount of polypropylene) of the first component by means of a laboratory Waring Blender. The resulting additive system dispersion was mixed mechanically with 44 lbs. (20 kg) of polymer before introducing the mixture to the feed hopper of the extruder. Typically, a standard portable cement mixer was charged with the polymer in pellet form. The mixer then was started and charged with the additive system. Mixing was allowed to continue for 20 minutes, after which time the mixture was removed from the mixer and stored in plastic-lined boxes.

The more significant process variables generally were as follows:

extruder temperature, 200°–233° C.;
melt inlet temperature, 233°–236° C.;
throughput, 39 kg per hour;
spin head temperature, 228°–233° C.;
pump block temperature, 231°–236° C.;
pack temperature, 237°–243° C.;
pack pressure, 200 psig;
melt temperature, 223°–224° C.

Webs were obtained which had basis weights of about 27, 41, and 68 g/m², respectively. Each web was wettable by water immediately after its formation without the need for any post-formation treatment. Thus, wettability was independent of basis weight. By comparison, when second component was omitted, it was necessary to increase the amount of first component to 200 g (1.0 weight percent, based on the amount of polypropylene) before webs were obtained which were immediately wettable without a post-formation treatment of any kind. These results are summarized in Table 6-1. Web C in the table is representative of a web lacking the second component, i.e., containing only the first component, whereas web 1 is representative of a web containing both the first component and second component.

TABLE 6-1

Spunbonded Webs Prepared with a Surface-Segregatable Additive

| Web | Wt. % 1st Comp. | Wt. % 2d Comp. | Wt. Ratio | Immediately Wettable |
|-----|-----------------|----------------|-----------|----------------------|
| C   | 1.0             | None           | —         | Yes                  |
| 1   | 0.45            | $1.5 \times 10^{-2}$ | 30  | Yes                  |

The data in Table 6-1 demonstrate that inclusion of second component at a level of $1.5 \times 10^{-2}$ permitted the reduction of first component by roughly 50 percent without affecting the wettability of the nonwoven web. It may be noted that the weight ratio of surface-segregatable first component to second component was 30.

Example 7 Preparation of Spunbonded Webs

Although Example 6 clearly demonstrates that the combination of surface-segregatable first component and second component employed permitted an approximately 50 percent reduction in the amount of first component without affecting the wettability of the nonwoven web, the data do not delineate ranges of either first component or second component which can be used. Consequently, the procedure of Example 6 was repeated a number of times, except that a different first component was used and varying amounts of first component and second component were employed.

The first component was another trisiloxane polyether which was similar to that employed in Example 6, except that the polyether moiety consisted of six ethyleneoxy units and was not end-capped.

The results are summarized in Table 7-1.

TABLE 7-1

Spunbonded Webs Prepared with Another Surface-Segregatable Additive

| Web | Wt. % 1st Comp. | Wt. % 2d Comp. | Wt. Ratio | Immediately Wettable |
|-----|-----------------|----------------|-----------|----------------------|
| 1   | 0.75            | None           | —         | Yes                  |
| 2   | 0.70            | None           | —         | No                   |
| 3   | 0.45            | $3.0 \times 10^{-2}$ | 15  | No                   |
| 4   | 0.40            | $5.0 \times 10^{-3}$ | 80  | Yes                  |
| 5   | 0.35            | $5.0 \times 10^{-3}$ | 70  | Yes                  |
| 6   | 0.30            | $5.0 \times 10^{-3}$ | 60  | No                   |

Two of the webs made from thermoplastic compositions containing both first component and second component were not immediately wettable, i.e, webs 3 and 6. With web 3, the level of first component was within the scope of the present invention, but the weight ratio of surface-segregatable first component to second component was 15 and outside of the permitted range. With web 6, the opposite was true. That is, the level of first component was outside of the permitted range, while the weight ratio was not. Webs 1 and 2 represent control webs which, under the conditions employed, demonstrate that the minimum amount of first component required to give a immediately wettable web is 0.75 percent by weight.

Having thus described the invention, numerous changes and modifications thereof will be readily apparent to those having ordinary skill in the art without departing from the spirit or scope of the invention. For example, the present invention can be applied to a single nonwoven web or to a laminate of two or more nonwoven webs. In the latter case, only one web can contain the additive system, i.e., the first component and second component, as described herein, or more than one web can contain such materials. By way of illustration, a three-layer nonwoven laminate finds extensive use in the manufacture of nonwoven workwear and such medical fabrics as surgical gowns and drapes and the like. Such laminates generally consist of a central meltblown layer with two outer spunbonded layers. In the application of the present invention to such a laminate, the additive system can be included in only the meltblown layer, in either or both of the outer spunbonded layers, or in all three layers. Other possible permutations for webs containing the additive system involve the choice of first component which can be a TSI first component or a surface-segregatable component, depending upon the characteristics or properties desired for each web. Other modifications and changes will be apparent to those having ordinary skill in the art.

What is claimed is:

1. A method for preparing a nonwoven web having improved tensile strength characteristics, which method comprises:

(A) melting a thermoplastic composition which comprises a thermoplastic polyolefin and an additive system comprising a first component and a second component;

(B) forming fibers by extruding the resulting melt through a die at a shear rate of from about 50 to about 30,000 sec$^{-1}$ and a throughput of no more than about 5.4 kg/cm/hour;

(C) drawing said fibers; and (D) collecting said fibers on a moving foraminous surface as a web of entangled fibers; in which:

(1) said first component is a polysiloxane polyether having the general formula,

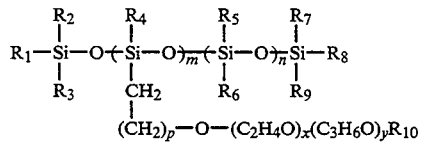

in which:

(a) $R_1$-$R_9$ are independently selected monovalent $C_1$-$C_3$ alkyl groups;

(b) $R_{10}$ is hydrogen or a monovalent $C_1$-$C_3$ alkyl group;

(c) m represents an integer of from 1 to about 100;

(d) n represents an integer of from 0 to about 100;

(e) the sum of m and n is in the range of from about 4 to about 100;

(f) p represents an integer of from 0 to about 5;

(g) x represents an integer of from 4 to about 25;

(h) y represents an integer of from 0 to about 25;

(i) the ratio of x to y is equal to or greater than 2;

(j) said first component has a molecular weight of from about 3,000 to about 18,000; and (k) said first component is present in an amount of from about 0.1 to about 3 percent by weight, based on the amount of thermoplastic polyolefin; and (2) said second component is a hydrophobic fumed silica, in which the weight ratio of said first component to said second component is in the range of from about 20 to about 70.

2. The method of claim 1, in which said polyolefin is polypropylene.

3. The method of claim 1, which includes the additional step of pattern bonding by the application of heat and pressure the web of entangled fibers resulting from step (D).

4. A method for preparing a nonwoven web having improved tensile strength characteristics, which method comprises:
(A) melting a thermoplastic composition which comprises a thermoplastic polyolefin and an additive system comprising a first component and a second component;
(B) forming continuous fibers by extruding the resulting melt through a die at a shear rate of from about 50 to about 30,000 sec$^{-1}$ and a throughput of no more than about 5.4 kg/cm/hour;
(C) drawing said continuous fibers;
(D) collecting said continuous fibers into a tow;
(E) cutting said tow into staple fibers;
(F) laying said staple fibers onto a moving foraminous surface as a web of entangled fibers; and
(G) pattern bonding the resulting web of entangled fibers by the application of heat and pressure; in which:
(1) said first component is a polysiloxane polyether having the general formula,

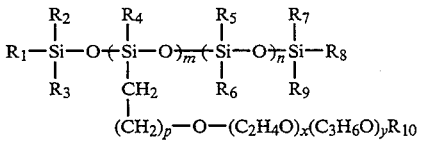

in which:
(a) $R_1$–$R_9$ are independently selected monovalent $C_1$–$C_3$ alkyl groups;
(b) $R_{10}$ is hydrogen or a monovalent $C_1$–$C_3$ alkyl group;
(c) m represents an integer of from 1 to about 100;
(d) n represents an integer of from 0 to about 100;
(e) the sum of m and n is in the range of from about 4 to about 100;
(f) p represents an integer of from 0 to about 5;
(g) x represents an integer of from 4 to about 25;
(h) y represents an integer of from 0 to about 25;
(i) the ratio of x to y is equal to or greater than 2;
(j) said first component has a molecular weight of from about 3,000 to about 18,000; and
(k) said first component is present in an amount of from about 0.1 to about 3 percent by weight, based on the amount of thermoplastic polyolefin; and
(2) said second component is a hydrophobic fumed silica, in which the weight ratio of said first component to said second component is in the range of from about 20 to about 70.

5. The method of claim 4, in which said polyolefin is polypropylene.

6. A method for preparing a wettable nonwoven web which (i) is wettable immediately after its formation without any post-formation treatment, (ii) remains wettable after its formation for at least two years at ambient temperature, and (iii) employs a reduced amount of a surface-segregatable first component, which method comprises:
(A) melting a thermoplastic composition which comprises a thermoplastic polyolefin and an additive system which comprises a surface-segregatable first component and a second component;
(B) forming fibers by extruding the resulting melt through a die at a shear rate of from about 50 to about 30,000 sec$^{-1}$ and a throughput of no more than about 5.4 kg/cm/hour;
(C) drawing said fibers; and
(D) collecting said fibers on a moving foraminous surface as a web of entangled fibers; in which:
(1) said surface-segregatable first component is a polysiloxane polyether having the general formula, $$R_1-\underset{\underset{R_3}{|}}{\overset{\overset{R_2}{|}}{Si}}-O+\underset{\underset{CH_2}{|}}{\overset{\overset{R_4}{|}}{Si}}-O)_m+\underset{\underset{R_6}{|}}{\overset{\overset{R_5}{|}}{Si}}-O)_n\underset{\underset{R_9}{|}}{\overset{\overset{R_7}{|}}{Si}}-R_8$$

$$(CH_2)_p-O-(C_2H_4O)_x(C_3H_6O)_yR_{10}$$

in which:
(a) $R_1$–$R_9$ are independently selected monovalent $C_1$–$C_3$ alkyl groups;
(b) $R_{10}$ is hydrogen or a monovalent $C_1$–$C_3$ alkyl group;
(c) m represents an integer of from 1 to about 4;
(d) n represents an integer of from 0 to about 3;
(e) the sum of m and n is in the range of from 1 to about 4;
(f) p represents an integer of from 0 to about 5;
(g) x represents an integer of from 1 to about 10;
(h) y represents an integer of from 0 to about 5;
(i) the ratio of x to y is equal to or greater than 2;
(j) said surface-segregatable first component has a molecular weight of from about 350 to about 1,200; and
(k) said surface-segregatable first component is present in an amount of from about 0.35 to about 3 percent by weight, based on the amount of thermoplastic polyolefin; and
(2) said second component is a hydrophobic fumed silica, in which the weight ratio of said surface-segregatable first component to said second component is in the range of from about 20 to about 300.

7. The method of claim 6, in which said polyolefin is polypropylene.

8. The method of claim 6, in which said surface-segregatable first component has a molecular weight of from about 350 to about 700.

9. The method of claim 6, which includes the additional step of pattern bonding by the application of heat and pressure the web of entangled fibers resulting from step (D).

10. A method for preparing a wettable nonwoven web which (i) is wettable immediately after its formation without any post-formation treatment, (ii) remains wettable after its formation for at least two years at ambient temperature, and (iii) employs a reduced amount of a surface-segregatable first component, which method comprises:

(A) melting a thermoplastic composition which comprises a thermoplastic polyolefin and an additive system comprising a surface-segregatable first component and a second component;

(B) forming continuous fibers by extruding the resulting melt through a die at a shear rate of from about 50 to about 30,000 sec$^{-1}$ and a throughput of no more than about 5.4 kg/cm/hour;

(C) drawing said continuous fibers;

(D) collecting said continuous fibers into a tow;

(E) cutting said tow into staple fibers;

(F) laying said staple fibers onto a moving foraminous surface as a web of entangled fibers; and (G) pattern bonding the resulting web of entangled fibers by the application of heat and pressure; in which:

(1) said surface-segregatable first component is a polysiloxane polyether having the general formula,

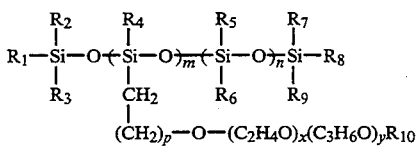

in which:

(a) $R_1$–$R_9$ are independently selected monovalent $C_1$–$C_3$ alkyl groups;

(b) $R_{10}$ is hydrogen or a monovalent $C_1$–$C_3$ alkyl group;

(c) m represents an integer of from 1 to about 4;

(d) n represents an integer of from 0 to about 3;

(e) the sum of m and n is in the range of from 1 to about 4;

(f) p represents an integer of from 0 to about 5;

(g) x represents an integer of from 1 to about 10;

(h) y represents an integer of from 0 to about 5;

(i) the ratio of x to y is equal to or greater than 2;

(j) said surface-segregatable first component has a molecular weight of from about 350 to about 1,200; and (k) said surface-segregatable first component is present in an amount of from about 0.35 to about 3 percent by weight, based on the amount of thermoplastic polyolefin; and (2) said second component is a hydrophobic fumed silica, in which the weight ratio of said surface-segregatable first component to said second component is in the range of from about 20 to about 300.

11. The method of claim 10, in which said polyolefin is polypropylene.

12. The method of claim 10, in which said surface-segregatable first component has a molecular weight of from about 350 to about 700.

* * * * *